US012221832B2

(12) United States Patent
Spray

(10) Patent No.: US 12,221,832 B2
(45) Date of Patent: Feb. 11, 2025

(54) ARCHITECTURAL-STRUCTURE COVERINGS, AND COMPONENTS THEREOF

(71) Applicant: Hunter Douglas Inc., Pearl River, NY (US)

(72) Inventor: Jeffrey L. Spray, Erie, CO (US)

(73) Assignee: HUNTER DOUGLAS INC., New York, NY (US)

( * ) Notice: Subject to any disclaimer, the term of this patent is extended or adjusted under 35 U.S.C. 154(b) by 249 days.

(21) Appl. No.: 17/918,475

(22) PCT Filed: Mar. 4, 2021

(86) PCT No.: PCT/US2021/020797
§ 371 (c)(1),
(2) Date: Oct. 12, 2022

(87) PCT Pub. No.: WO2021/221788
PCT Pub. Date: Nov. 4, 2021

(65) Prior Publication Data

US 2023/0143993 A1 May 11, 2023

Related U.S. Application Data

(60) Provisional application No. 63/137,230, filed on Jan. 14, 2021, provisional application No. 63/119,694,
(Continued)

(51) Int. Cl.
*E06B 9/32* (2006.01)
*E06B 9/322* (2006.01)
(Continued)

(52) U.S. Cl.
CPC ................ *E06B 9/322* (2013.01); *E06B 9/34* (2013.01); *E06B 2009/2435* (2013.01)

(58) Field of Classification Search
CPC ... E06B 9/322; E06B 9/34; E06B 9/56; E06B 9/60; E06B 9/62; E06B 2009/2435
See application file for complete search history.

(56) References Cited

U.S. PATENT DOCUMENTS 4,931,708 A * 6/1990 Johnsen .................... E06B 9/72 160/133
5,628,356 A 5/1997 Marocco
(Continued)

FOREIGN PATENT DOCUMENTS

WO 2018080910 A1 5/2018

OTHER PUBLICATIONS

International Search Report and Written Opinion mailed Aug. 6, 2021, for the International Patent Application No. PCT/US2021/020797, 19 pages.

*Primary Examiner* — Johnnie A. Shablack
(74) *Attorney, Agent, or Firm* — KDW Firm PLLC

(57) ABSTRACT

An architectural-structure covering may include a covering moveable between retracted and extended positions, and between closed and open configurations. The covering may include front and rear sheets and a plurality of vanes extending therebetween. In the extended position, the covering may be configured so that the vanes are opened such that they are positioned substantially perpendicular to the incoming light. The architectural-structure covering may also include a rotatable member and an external booster movable between a first state of operation wherein the external booster stores potential energy and a second state of operation wherein the external booster releases the stored potential energy to rotate the rotatable member in a predetermined direction to effect additional rotation of a covering.

25 Claims, 26 Drawing Sheets

Related U.S. Application Data filed on Dec. 1, 2020, provisional application No. 63/017,044, filed on Apr. 29, 2020.

(51) Int. Cl.
*E06B 9/34* (2006.01)
*E06B 9/24* (2006.01)

(56) References Cited

U.S. PATENT DOCUMENTS

| | | | | |
|---|---|---|---|---|
| 6,155,328 | A * | 12/2000 | Welfonder | E06B 9/62<br>192/58.3 |
| 7,380,582 | B1 | 6/2008 | Anderson et al. | |
| 8,511,364 | B2 * | 8/2013 | Anderson | E06B 9/262<br>160/84.05 |
| 8,643,321 | B2 * | 2/2014 | Leivenzon | E06B 9/72<br>318/463 |
| 8,739,854 | B2 * | 6/2014 | Mullet | E06B 9/60<br>160/293.1 |
| 9,080,381 | B2 * | 7/2015 | Haarer | E06B 9/42 |
| 9,103,157 | B2 * | 8/2015 | Mullet | E06B 9/62 |
| 9,162,094 | B2 * | 10/2015 | Hsieh | A62C 2/247 |
| 9,234,377 | B2 * | 1/2016 | Schatz | E06B 3/44 |
| 9,273,508 | B2 * | 3/2016 | Manaras | E06B 9/88 |
| 9,489,834 | B2 * | 11/2016 | Hall | E06B 9/326 |
| 9,739,089 | B2 | 8/2017 | Smith | |
| 9,765,565 | B2 * | 9/2017 | Morris | E06B 9/262 |
| 9,816,317 | B2 * | 11/2017 | Chen | E06B 9/42 |
| 10,435,945 | B2 * | 10/2019 | Buccola, Jr. | E06B 9/34 |
| 10,443,304 | B2 | 10/2019 | Colson et al. | |
| 10,501,988 | B2 * | 12/2019 | Fisher | E06B 9/84 |
| 10,655,384 | B2 * | 5/2020 | Foley | E06B 9/322 |
| 10,704,324 | B2 * | 7/2020 | Goldberg | E06B 9/32 |
| 10,781,630 | B2 | 9/2020 | Buccola, Jr. et al. | |
| 10,895,105 | B1 * | 1/2021 | Marchese | E06B 9/322 |
| 11,149,489 | B2 * | 10/2021 | Spray | E06B 9/322 |
| 11,286,715 | B2 * | 3/2022 | Marzilli | E06B 9/60 |
| 11,421,473 | B2 * | 8/2022 | Campagna | E06B 9/72 |
| 12,024,943 | B2 * | 7/2024 | Freirich | E06B 9/322 |
| 2006/0118248 | A1 | 6/2006 | Anderson et al. | |
| 2008/0202709 | A1 | 8/2008 | Anderson et al. | |
| 2008/0236764 | A1 * | 10/2008 | Cheng | E06B 9/322<br>160/84.02 |
| 2012/0048485 | A1 | 3/2012 | Fu-Lai et al. | |
| 2012/0073765 | A1 * | 3/2012 | Hontz | E06B 9/304<br>160/331 |
| 2014/0138037 | A1 | 5/2014 | Colson et al. | |
| 2014/0216666 | A1 | 8/2014 | Smith et al. | |
| 2014/0262068 | A1 | 9/2014 | Buccola, Jr. et al. | |
| 2015/0368966 | A1 | 12/2015 | Faller | |
| 2015/0368969 | A1 | 12/2015 | Lin | |
| 2015/0376941 | A1 | 12/2015 | Fujita et al. | |
| 2017/0044823 | A1 | 2/2017 | Colson et al. | |
| 2017/0081914 | A1 * | 3/2017 | Wu | E06B 9/327 |
| 2018/0119485 | A1 | 5/2018 | Colson et al. | |
| 2018/0171703 | A1 | 6/2018 | Buccola, Jr. et al. | |
| 2020/0024897 | A1 | 1/2020 | Colson et al. | |
| 2021/0262282 | A1 * | 8/2021 | Xia | E06B 9/62 |
| 2023/0042244 | A1 * | 2/2023 | Kirby | E06B 9/42 |
| 2023/0143993 | A1 * | 5/2023 | Spray | E06B 9/322<br>160/168.1 R |
| 2024/0076935 | A1 * | 3/2024 | Wang | E06B 9/72 |

* cited by examiner

ARCHITECTURAL-STRUCTURE COVERINGS, AND COMPONENTS THEREOF

CROSS-REFERENCE TO RELATED APPLICATIONS

This application is a National Phase filing of International Application No. PCT/US2021/020797, filed Mar. 4, 2021, which application makes reference to and claims the benefit of the filing date of U.S. provisional patent application No. 63/017,044, filed Apr. 29, 2020, entitled "External Booster for an Architectural-Structure Covering," and makes reference to and claims the benefit of U.S. provisional patent application No. 63/137,230, filed Jan. 14, 2021, entitled "Roller Tube for an Architectural-Structure Covering," and makes reference to and claims the benefit of U.S. provisional patent application No. 63/119,694, filed Dec. 1, 2020, entitled "Covering for Use in an Architectural-Structure Covering," the entirety of each application is incorporated by reference herein.

FIELD OF THE DISCLOSURE

The present disclosure relates generally to architectural-structure coverings, and more particularly to one or more features for use in an architectural-structure covering. For example, in one embodiment, an improved covering for use in an architectural-structure covering is disclosed. The covering being arranged and configured to be over-rotated in the fully deployed or extended position so that the vanes of the covering disposed between front and rear sheets of the covering are orientated substantially perpendicular to the incoming light (e.g., sunrays). In another embodiment, an improved rotatable member (e.g., a roller tube) for an architectural-structure covering is disclosed. The rotatable member being arranged and configured to prevent premature deployment of a bottom rail. In another embodiment, an external booster for facilitating movement, rotation, deployment, extension, or the like, of a covering of an architectural-structure covering to a fully deployed position is disclosed.

BACKGROUND OF THE DISCLOSURE

Architectural-structure coverings for architectural openings and/or structures, such as windows, doors, archways, portions of a wall, and the like (collectively an architectural structure without the intent to limit), have taken numerous forms for many years. One known architectural-structure covering includes a covering such as a fabric that is movable between an extended or deployed position and a retracted position. For example, the covering can be vertically extendable or retractable (e.g., able to be lowered or raised, respectively, in a vertical direction) between an extended position and a retracted position for obscuring and exposing the underlying architectural structure.

To move the covering between the extended and retracted positions, some architectural-structure coverings include a rotatable member (e.g., a rod, a roller, a tube, etc.). Rotation of the rotatable member in a first direction retracts the covering while rotation of the rotatable member in a second, opposite direction extends the covering. The covering of the architectural-structure covering may be gathered or stacked adjacent to, or wrapped around, the rotatable member. For example, in various embodiments, the covering can either be wrapped about the rotatable member to retract the covering or unwrapped from the rotatable member to extend the covering. Regardless of the form of the covering, rotation of the rotatable member generally causes movement of the covering of the architectural-structure covering. To actuate movement of the rotatable member, and thus the covering of the architectural-structure covering, an operating system may be operably coupled to the rotatable member.

The operating system may be operatively associated with an operating element, for example, a cord, a chain, a tilt wand, or the like. The operating element may be manipulated by a human operator to move the covering between the extended and retracted positions. Alternatively, the operating system may include a motorized controller to lower or raise the covering. For example, a motorized drive motor (e.g., an electric motor) can be provided to move the covering between the extended position and the retracted position. In one embodiment, the operating element may include a hand-held remote or the like to actuate the motorized drive motor and/or other aspects of the architectural structure covering.

The architectural-structure covering may further include a bottom rail attached to a bottom portion of the covering. The bottom rail may be an elongate member that is coupled to or mounted (such terms may be used interchangeable herein without the intent to limit) to a bottom portion of the covering. The bottom rail may be provided to add weight to the bottom portion of the covering to encourage the covering to drop under a gravitational force during deployment, extension, etc.

One known type of architectural-structure covering is a Silhouette® shade manufactured and sold by Hunter Douglas, Inc. Referring to FIGS. 1-4, the architectural-structure covering 10 includes a head rail assembly 14, a covering 22, and a bottom rail 18. As will be described herein, the architectural-structure covering 10 may also include a second covering 24 and a bottom rail 20 coupled to the second covering 24. As such, the covering 22 may also be referred to herein as a first covering 22 and the bottom rail 18 may be referred to as a first bottom rail 18. Covering 24 may also be referred to herein as a second covering 24 and the bottom rail 20 may be referred to as a second bottom rail 20.

The head rail assembly 14 may include two opposing end caps *26a*, *26b*, which may enclose the ends of the head rail assembly 14 to provide a finished appearance. As will be appreciated, one or more rotatable members (e.g., rotors, rollers, tubes, etc.) may be positioned within the head rail assembly 14 and operatively coupled to the covering. The first covering 22 may extend between the head rail assembly 14 and the first bottom rail 18. The first bottom rail 18 may extend horizontally along a lower edge of the first covering 22 and may function as a ballast to maintain the first covering 22 in a taut condition and to aid in a gravity-driven extension of the first covering 22.

The first covering 22 may include a vertically suspended front sheet 30 of flexible material (such as sheer fabric), a vertically suspended rear sheet 34 of flexible material, and a plurality of horizontally-extending, vertically-spaced flexible vanes 38. Each of the vanes 38 may be secured along horizontal lines of attachment with a front edge attached to the front sheet 30 and a rear edge attached to the rear sheet 34. The front and rear sheets 30, 34 and vanes 38 may form a plurality of elongated, vertically-aligned, longitudinally-extending cells, which collectively may be referred to as a cellular panel. In the final, fully extended or deployed position (FIGS. 2-4), each of the vanes 38 may extend substantially horizontally between the front and rear sheets 30, 34.

Referring to FIGS. 1 and 2, the architectural-structure covering 10 is shown with the first covering 22 in two different extended positions. FIG. 1 depicts the first covering 22 in a partially extended position in which further rotation of the rotatable member in an extending direction moves the front and rear sheets 30, 34 generally vertically (relative to each other) to shift the vanes 38 between open and closed configurations. When in the closed or collapsed configuration of FIG. 1, the front and rear sheets 30, 34 are relatively close together (e.g., the front and rear sheets 30, 34 are positioned directly adjacent to each other) and the vanes 38 extend vertically in an approximately coplanar, contiguous relationship with the front and rear sheets 30, 34. FIG. 2 depicts the first covering 22 in a fully extended or deployed position with the vanes 38 in an open or expanded configuration. In this position, the front and rear sheets 30, 34 are horizontally spaced apart from each other with the vanes 38 extending substantially horizontally therebetween.

Referring to FIGS. 3 and 4, and as previously mentioned, in one or more various embodiments, the architectural-structure covering 10 may also include a second covering 24 positioned rearward of the first covering 22 (e.g., closer to, for example, a window). The second covering 24 may extend between the head rail assembly 14 and a bottom rail 20. The bottom rail 20 of the second covering 24 may extend horizontally along a lower edge of the second covering 24 and may function as a ballast to maintain the second covering 24 in a taut condition.

In use, the first and second coverings 22, 24 may be constructed of substantially any type of material and/or constructed in any manner. For example, the first and second coverings 22, 24 may be constructed from natural and/or synthetic materials, including fabrics, polymers, and/or other suitable materials. Fabric materials may include woven, non-woven, knits, or other suitable fabric types. The first and second coverings 22, 24 may have any suitable level of light transmissivity. For example, the first and second coverings 22, 24 may be constructed of transparent, translucent, and/or opaque materials to provide a desired ambience or decor in an associated room. In some examples, the first covering 22 includes first and second sheets 30, 34 that are transparent and/or translucent, and vanes 38 that are translucent and/or opaque. In some examples, the second covering 24 is made of a single sheet of material with zero light transmissivity, often referred to as a black-out shade. The second covering 24 may include patterns or designs so that when the second covering 24 is extended behind the first covering 22, the second covering 24 creates a different aesthetic appearance than the first covering 22 by itself.

Additional information on the arrangement and construction of the architectural-structure covering 10 can be found in, for example, U.S. patent application Ser. No. 15/789,014, filed on Oct. 20, 2017, entitled "Covering for Architectural Features, Related Systems, and Methods of Manufacture," and U.S. patent application Ser. No. 15/339,445, filed on Oct. 31, 2016, now U.S. Pat. No. 10,443,304, entitled "Covering for Architectural Openings with Coordinated Vane Sets," the entire disclosure of each application is incorporated into the present application in their entirety.

In use and as previously mentioned, the first covering 22 and/or the second covering 24 may be operably associated with a rotatable member so that rotational movement of the rotatable member about a longitudinally-extending axis moves the first and/or second coverings 22, 24 between the extended and retracted positions. For instance, the first covering 22 may be coupled to and wrappable about a rotatable member so that rotation of the rotatable member in a first direction may retract the first covering 22 and rotation of the rotatable member in a second, opposite direction may extend the first covering 22. Similarly, the second covering 24 may be operatively coupled with a rotatable member so that rotational movement of the rotatable member about a longitudinally-extending axis moves the second covering 24 between the extended and retracted positions. The first and/or second coverings 22, 24 may be wrapped about or unwrapped from a rear side of the rotatable member, with a rear side of the rotatable member positioned between a front side of the rotatable member and a street side of an associated architectural structure. Alternatively, the first and/or second coverings 22, 24 may be wrapped about or unwrapped from the front side of the rotatable member.

In use, to move the first and/or second covering 22, 24, an operator may manipulate the operating system. For example, as illustrated in the example embodiment of FIGS. 1-4, the operating system may include an operating element 42. As will be generally appreciated, to raise or retract the covering such as, for example, the first covering 22 from an extended position, the operator may pull the operating element 42 downward. To extend or lower the first covering 22 from a retracted position, the operator may manipulate the operating element 42 to release a brake, which may allow the covering to automatically lower under the influence of gravity. Alternatively, the operating element 42 may be replaced with an electric motor configured to extend or retract the covering upon receiving an extension or retraction command. For example, the motor may include a gravity lower state to permit the covering to lower via gravity without motor intervention, thereby reducing power consumption. As will be appreciated by one of ordinary skill in the art, the operating system including the operating element may take on numerous forms for controlling movement of a covering.

In one embodiment, the second covering 24 may be extended or lowered such as, for example, automatically extended or lowered, when the first covering 22 reaches its fully deployed position. Alternatively, the second covering 24 may include a second operating element for controlling the second covering 24.

In use, positioning of the vanes in the fully deployed or extended position may effect shadow lines due to light encountering the covering. For example, one concern with current coverings such as, for example, the first covering 22 shown in FIGS. 1-4, is that in the open configuration of the fully extended or deployed position, the vanes 38 extending between the front and rear sheets 30, 34 may cause or cast shadow-lines onto the floor of the interior room as the incoming light encounters the covering 22. Shadow-lines may occur when, for example, incoming light on a higher vane cast a visible shadow through a lower vane and/or when incoming light encounters the horizontal line of attachment between the vanes and the rear sheet of the covering. As a result, in order to prevent the incoming light from casting shadow-lines onto the floor of the interior room, users maintain the covering 22 in the closed configuration (or deploy the optional second covering 24). However, in either of these two configurations, view-thru the covering is prevented (e.g., view to the outside is eliminated).

In addition, and/or alternatively, referring to FIG. 5, in one embodiment, the architectural-structure covering may include a rotatable member 50. The rotatable member 50 may include an inner roller 60 and an outer roller 70, and thus may be interchangeably referred to herein as a rotatable member or a dual roller unit 50. The inner roller 60 may be positioned inside of the outer roller 70, and the inner and outer rollers 60, 70 may be coaxially aligned about the same rotational axis. In use, the second covering 24 may be coupled at a top edge to the inner roller 60. The outer roller 70 may be generally cylindrical in shape and may surround the inner roller 60. The first covering 22 may be coupled at a top edge to the outer roller 70. The outer roller 70 may include a slot 72 extending along a length of the outer roller 70 and in communication with an interior of the outer roller 70. The slot 72 can permit passage of the second covering 24 during extension and retraction of the second covering 24. The dual roller unit 50 may be rotatably supported by the opposing end caps 26*a*, 26*b*.

In use, the first covering 22 may be coupled to and wrappable about the outer roller 70 while the second covering 24 may be coupled to and wrappable about the inner roller 60. In the fully-retracted positions, the first and second coverings 22, 24 may be concealed within the head rail assembly 14. In this position, the second covering 24 is fully wrapped about the inner roller 60 and the first covering 22 is fully wrapped about the outer roller 70. To extend the first covering 22 from the head rail assembly 14, the user may actuate the operating system such as, for example, a drive motor, an operating element, etc. to cause the inner roller 60 to rotate in the extension direction, which in turn causes the outer roller 70 to rotate in the extension direction due at least in part to the weight of the first bottom rail 18 applying a downward force to the first covering 22. That is, as the first covering 22 extends off the outer roller 70, the outer roller 70 generally rotates in unison with the inner roller 60. In use, the first covering 22 extends off of the outer roller 70 in the closed or collapsed configuration in which the front and rear sheets 30, 34 are relatively close together, as generally illustrated in FIG. 1. Once the first covering 22 is substantially unwrapped from the outer roller 70, continued rotation of the outer roller 70 in the extension direction moves the front and rear sheets 30, 34 generally vertically relative to each other to shift the vanes 38 from the closed configuration to the open configuration, as generally illustrated in FIG. 2. When the first covering 22 reaches the fully extended position with the vanes 38 in the open or expanded configuration, the second covering 24 may be extended, as generally illustrated in FIG. 3. Due to the weight of the first covering 22 on the outer roller 70, the outer roller 70 remains stationary (e.g., the outer roller 70 does not rotate). Thus arranged, the inner roller 60 is driven via, for example, a motorized drive motor or a spring-assisted motor. The outer roller 70 is moved due to, for example, the force of gravity, friction caused by the first covering 22 wrapping or unwrapping from the outer roller 70, etc.

Additional information on the operation and construction of a dual roller unit 50 can be found in, for example, U.S. patent application Ser. No. 15/895,061, filed on Feb. 13, 2018, now U.S. Pat. No. 10,781,630, entitled "Covering for an Architectural Opening Having Nested Rollers," the entire disclosure of which is incorporated into the present application. FIG. 5 illustrates an example of an embodiment of a dual roller unit 50 including an inner roller 60 and an outer roller 70. FIG. 5 illustrating the first covering 22 in the fully extended position so that the bottom rail 20 of the second covering 24 is exposed.

For certain types of architectural-structure coverings, such as the Silhouette® shade, gravity alone may be insufficient to fully actuate or open the first covering 22 (e.g., to fully open the first covering 22) or to ensure consistent deployment of the first covering 22 to the open configuration. For example, during the final, approximate one-half revolution of the rotatable member in the extension direction, the rotatable member separates the front and rear sheets 30, 34, lifts the front sheet 30, and lifts a front-side of the vanes 38. At least a portion of the movement of the front sheet 30 and the vanes 38 opposes gravity, and thus in many circumstances the first covering 22 may not fully open via gravity. Similarly, gravity alone may be insufficient to fully extend other types of architectural-structure coverings. For example, some coverings wrap around and unwrap from a front side of the rotatable member. For these types of shades, a final, approximate one-quarter revolution of the rotatable member rotates the covering from a bottom-dead center location toward the architectural structure in which the covering is raised relative to the bottom-dead center location. The arcuate motion of the covering during this final one-quarter revolution of the rotatable member works against gravity and thus rotational assistance may be needed to overcome the downward gravitational force.

Thus, a booster or supplemental revolution assembly (used interchangeably herein without the intent to limit) may be incorporated to ensure that the covering may be extended or deployed to a fully deployed condition. For instance, in certain embodiments, a booster may be used to ensure that the covering such as, for example, the first covering 22, is consistently deployed to the fully extended or deployed position. Additional information on the operation and construction of a known booster can be found in, for example, U.S. patent application Ser. No. 14/770,204, filed on Aug. 25, 2015, now U.S. Pat. No. 9,739,089, entitled "Covering for an Architectural Opening," the entire disclosure of which is incorporated into the present application.

One disadvantage associated with the booster disclosed in the '204 patent application is that the booster is positioned inside of the rotatable member (e.g., the booster is positioned inside of the interior of the rotatable member). Thus arranged, the booster cannot be used in connection with a dual roller unit. In addition, and/or alternatively, in one or more embodiments, it may be beneficial or desirable to provide additional rotation as compared to the amount of additional rotation provided by the booster of the '204 patent application.

Moreover, referring to FIGS. 6A and 6B, one concern associated with the dual roller units is that when the first covering 22 is fully extended and the bottom rail 20 of the second covering 24 is exposed (such as, for example, as illustrated in FIG. 5), the bottom rail 20 of the second covering 24 may prematurely begin to drop from the outer roller 70 of the dual roller unit 50, which may cause the bottom rail 20 of the second covering 24 to contact the head rail assembly 14 (e.g., since the first covering 22 is fully extended, the bottom rail 20 of the second covering 24 is no longer covered by the first covering 22 and thus, due to gravity, may prematurely release or drop out of a channel formed in the outer roller 70).

In addition, during use, a time delay (e.g., milli-seconds) may occur between the time when the inner roller 60 is still rotating but the outer roller 70 remains stationary. For example, when a booster is utilized to provide supplemental rotation, a time delay may occur when the inner roller 60 is still rotating but the outer roller 70 is stationary (e.g., before the booster fires). The resulting time delay may result in slack of the second covering 24, which may allow the bottom rail 20 of the second covering 24 to prematurely release or drop from the outer roller 70, which may cause the bottom rail 20 of the second covering 24 to contact the head rail assembly 14 when one is present.

It is with respect to these and other considerations that the present improvements may be useful.

SUMMARY

This Summary is provided to introduce in a simplified form, a selection of concepts that are further described below in the Detailed Description. This Summary is not intended to identify key features or essential features of the claimed subject matter, nor is it intended as an aid in determining the scope of the claimed subject matter.

In accordance with one feature of the present disclosure, an external booster for use with an architectural-structure covering is disclosed. In use, the external booster is arranged and configured to operatively engage a rotatable member associated with a covering of the architectural-structure covering to provide additional rotation to the rotatable member, and hence the covering.

In one embodiment, the external booster is arranged and configured to transition from a first configuration or a first state of operation (terms used interchangeably herein without the intent to limit) to a second configuration or a second state of operation. In the first configuration, the external booster is arranged and configured to store potential energy. In the second configuration, the external booster releases the stored potential energy in the form of kinetic energy to rotate the rotatable member in a specific direction to effect full extension or deployment of the covering. In one embodiment, the external booster is arranged and configured to transition from the first configuration to the second configuration at a specific covering position during extension or deployment of the covering.

In one embodiment, the external booster is arranged and configured to be positioned outside or exterior of the rotatable member, while still being positioned within the head rail assembly of the architectural-structure covering. For example, the external booster may include an anchoring and/or coupling mechanism. In one embodiment, the anchoring mechanism secures the external booster to the one of the end caps of the architectural-structure covering. The coupling mechanism is arranged and configured to rotatably engage the rotatable member. In one embodiment, the external booster may include one or more gears for engaging a gear associated with the rotatable member.

In one embodiment, the one or more gears may be arranged and configured as a flexible, compressible, or spring-loaded gear (terms used interchangeably herein without the intent to limit). Thus arranged, the one or more flexible gears are arranged and configured to provide a friction fit meshing with corresponding gears to prevent, or at least, reduce unwanted backlash and/or unwanted clearance. For example, in one embodiment, the one or more gears may include a plurality of cutouts formed in a body thereof. In one embodiment, the plurality of cutouts may be spiral-shaped, alternatively however, other shapes are envisioned. Preferably, the cutouts are arranged and configured to provide a substantially uniform pressure around the gear. Alternatively, and/or in addition, in one embodiment, the one or more gears may be manufactured from a flexible material arranged and configured to enable the flexible gear to flex and/or compress.

In one embodiment, the external booster also includes a biasing mechanism and a retention mechanism. The biasing mechanism is arranged and configured with a preloaded resilient force when the external booster is in the first configuration. The biasing mechanism is arranged and configured to remain in the preloaded state until the covering reaches a predetermined position. Thereafter, when the external booster is transitioned to the second configuration, the biasing mechanism is arranged and configured to release its preloaded resilient force causing the retention mechanism to rotate, which causes the rotatable member, and hence the covering associated therewith, to rotate.

The retention mechanism may be configured to retain the potential energy or preload in the biasing mechanism until the covering reaches the predetermined position. The retention mechanism may be selectively associated with the anchoring mechanism to either restrict or permit movement of the biasing mechanism. When associated (e.g., coupled) with the anchoring mechanism (e.g., when the external booster is in the first configuration), the retention mechanism restricts movement of the biasing mechanism, thereby maintaining the preload in the biasing mechanism. When not associated (e.g., disconnected or decoupled) with the anchoring mechanism (e.g., when the external booster is in the second configuration), the retention mechanism permits movement of the biasing mechanism, thereby enabling conversion of the stored potential energy into kinetic energy, which rotates the rotatable member and further movement or rotation of the covering to the fully deployed position.

In use, the retention mechanism, or at least a portion or element thereof, is movable between a first position and a second position. Movement of the retention mechanism into the first position may connect the biasing mechanism and the anchoring mechanism. Movement of the retention mechanism into the second position may disconnect the biasing mechanism from the anchoring mechanism.

Once released, the potential energy or preload of the biasing mechanism may be restored during normal covering operation. For instance, during retraction of the covering, rotation of the rotatable member in the opposite direction may affect movement of the retention mechanism, which in turn may affect movement of the biasing mechanism in a preloading direction. Once a desired preload is achieved, the retention mechanism may move into the first position (e.g., transiting the external booster back to its first configuration) to maintain the preload in the biasing mechanism for use during the next covering operating cycle. When in the first position, the retention mechanism may be positioned so as to not interfere with covering operation. As such, an architecture-structure covering is provided that includes a covering that may be repeatedly lowered via gravity into a fully operational position in a continuous, uninterrupted, smooth action without operator intervention.

In one embodiment, an architectural-structure covering is disclosed. The architectural-structure covering comprises a rotatable member, a covering operatively coupled to the rotatable member, the covering being movable between a retracted position and an extended position, and an external booster operatively coupled to the rotatable member. In one embodiment, the external booster comprises a biasing mechanism operably associated with the rotatable member to selectively rotate the rotatable member in an extension direction, the biasing mechanism having a preload, and a retention mechanism associated with the biasing mechanism and operable to release the preload at the extended position, wherein the external booster is spaced apart from the rotatable member, the external booster being coupled to the rotatable member via one or more gears arranged and configured to transfer rotation between the external booster and the rotatable member.

In one embodiment, the external booster is arranged and configured to transition from a first configuration to a second configuration, in the first configuration, the external booster stores potential energy, in the second configuration, the external booster releases the stored potential energy to rotate the rotatable member.

In one embodiment, the external booster transitions from the first configuration to the second configuration at a predetermined covering position during extension of the covering.

In one embodiment, with the external booster in the first configuration, the biasing mechanism is preloaded, and when the external booster is transitioned to the second configuration, the biasing mechanism releases the preload to rotate the rotatable member.

In one embodiment, movement of the covering from the extended position to the retracted position, automatically transitions the external booster from the second configuration to the first configuration, and thus preloads the biasing mechanism.

In one embodiment, the external booster includes a non-rotatable shaft.

In one embodiment, the non-rotatable shaft is arranged and configured to couple to an end plate of a head rail assembly of the architectural-structure covering.

In one embodiment, the external booster further comprises a coupling mechanism movable between a first position and a second position, the retention mechanism being coupled to the non-rotatable shaft when the coupling mechanism is in the first position, the retention mechanism being disconnected from the non-rotatable shaft when the coupling mechanism is in the second position.

In one embodiment, the biasing mechanism includes a spring guide, a spring cap, and a spring, the spring cap being rotationally fixed to the non-rotatable shaft, the spring guide including a bore arranged and configured to enable the non-rotatable shaft to pass therethrough, the spring being positioned between the spring cap and the spring guide arranged and configured to bias the spring guide away from the spring cap.

In one embodiment, in the first configuration, the spring biases the spring guide away from the spring cap, and the spring guide is inhibited from moving, in the second configuration, the spring guide is movable so that the spring applies a force to the spring guide causing the retention mechanism and hence the rotatable member to rotate.

In one embodiment, the retention mechanism includes an externally threaded bolt, a traveling nut, and a drive sleeve, the traveling nut being threadably coupled to the externally threaded bolt such that rotation of the traveling nut relative to the externally threaded bolt causes the traveling nut to axially translate along a longitudinal length of the externally threaded bolt, the externally threaded bolt including a bore arranged and configured to pass the non-rotatable shaft to therethrough.

In one embodiment, in the first configuration, the externally threaded bolt is inhibited from rotating, and in the second configuration, the externally threaded bolt is permitted to rotate.

In one embodiment, the externally threaded bolt is operatively coupled to the spring cap so that, in the second configuration, the spring biases the spring cap causing the spring cap and the externally threaded bolt to rotate in unison.

In one embodiment, rotation of the spring cap and the externally threaded bolt causes the traveling nut and the drive sleeve to rotate, the drive sleeve being coupled to one of the one or more gears, so that rotation of the drive sleeve rotates the rotatable member.

In one embodiment, rotation of the traveling nut causes the traveling nut to axially translate toward a first end portion of the externally threaded bolt causing the traveling nut to contact a coupling mechanism causes the coupling mechanism to move from a first position to a second position.

In one embodiment, the coupling mechanism is a pawl, in the first position, a portion of the pawl is received within a pocket formed in the non-rotatable shaft, in the second position, the portion of the pawl is removed from the pocket formed in the non-rotatable shaft.

In one embodiment, axial translation of the traveling nut towards the first end portion of the externally threaded bolt causes the traveling nut to contact the pawl moving the pawl from the first position to the second position.

In one embodiment, the pawl includes a pin extending from a rear surface of the pawl, the traveling nut includes a pathway formed in a contacting surface thereof, interaction between the pin and the pathway causing the pawl to move from the first position to the second position.

In one embodiment, the covering is a first covering and the rotatable member includes an outer roller operatively associated with the first covering and an inner roller positioned within the outer roller, the inner roller operatively associated with a second covering.

In one embodiment, the first covering is movable between the retracted position and the extended position, and between an open configuration and a closed configuration, the first covering including a front sheet, a rear sheet, and a plurality of vanes extending between the front and rear sheets, in the closed configuration, the front and rear sheets are positioned directly adjacent to each other and the plurality of vanes extend vertically in an approximately coplanar, contiguous relationship with the front and rear sheets, in the open configuration, the front and rear sheets are spaced apart from each other with the plurality of vanes extending therebetween, and the external booster is arranged and configured to provide supplemental rotation to ensure that the first covering is rotated to the open configuration.

In one embodiment, an external booster for use with an architectural-structure covering is disclosed. The architectural-structure covering includes a rotatable member and a covering coupled to the rotatable member. The covering is movable between a first position and a second position via rotation of the rotatable member. In one embodiment, the external booster is movable between a first state of operation and a second state of operation, in the first state of operation the external booster is arranged and configured to store potential energy, and in the second state of operation, the external booster releases the stored potential energy to rotate the rotatable member in a predetermined direction to effect additional rotation of the covering, the external booster is spaced apart from the rotatable member, the external booster being coupled to the rotatable member via one or more gears arranged and configured to transfer rotation between the external booster and the rotatable member, and the external booster is arranged and configured to transition from the first state of operation to the second state of operation at a predetermined covering position during extension or deployment of the covering.

In one embodiment, the one or more gears may be arranged and configured as a flexible gear arranged and configured to provide a friction fit meshing with corresponding gears to prevent, or at least, reduce unwanted backlash and/or unwanted clearance. For example, in one embodiment, the one or more gears may include a plurality of cutouts formed in a body thereof. In one embodiment, the plurality of cutouts may be spiral-shaped alternatively however, other shapes are envisioned. Preferably, the cutouts are arranged and configured to provide a substantially uniform pressure around the gear. Alternatively, and/or in addition, in one embodiment, the one or more gears may be manufactured from a flexible material so that a central portion of the flexible gear is arranged and configured to flex and/or compress (e.g., center portion can be rendered flexible while the tooth geometry (e.g., outer teeth) and the inner diameter of the hub or bore retains its original molded size and shape).

In addition, and/or alternatively, in accordance with another feature of the present disclosure, a rotatable member (e.g., roller tube) of an architectural-structure covering is disclosed. The rotatable member including a scoop arranged and configured to create a pocket or cradle to hold, secure, maintain, etc. a position of a bottom rail to prevent, or at least minimize, premature deployment of the bottom rail. For example, in one embodiment, the scoop may be arranged and configured to create a pocket or cradle to maintain a position of a bottom rail relative to an outer roller to enable the bottom rail to rotate with the outer roller past the head rail assembly without contacting the head rail assembly. Thereafter, on the next rotational pass when the scoop is positioned within a specified, predetermined range of positions, the scoop enables the bottom rail to release or drop from the outer roller within the specified, predetermined position.

In one embodiment, an architectural-structure covering is disclosed. The architectural-structure covering comprising a rotatable member, a covering, and a bottom rail. The covering including a top portion and a bottom portion, the top portion operatively coupled to the rotatable member. The covering being movable between a retracted position and an extended position. The bottom rail is operatively coupled to the bottom portion of the covering. The rotatable member includes a scoop defining a pocket arranged and configured to maintain the bottom rail within the pocket when the rotatable member is not positioned within a predetermined or desired rotational range and, when positioned within the predetermined or desired rotational range, the scoop is arranged and configured to enable the bottom rail to deploy from the rotatable member.

In one embodiment, the scoop includes a first arm and a second arm, the first arm extending away from an outer surface of the rotatable member, the second arm extending at an angle relative to the first arm so that the pocket is defined between an inner surface of the first and second arms and the outer surface of the rotatable member.

In one embodiment, the scoop includes an approximate "L" or "C" shape.

In one embodiment, the scoop includes an opening in communication with the pocket, the opening positioned in a leading direction of rotation of the rotatable member.

In one embodiment, the bottom rail and the scoop include corresponding bumps, the corresponding bumps arranged and configured to contact each other when the rotatable member is not positioned within the predetermined or desired rotational range to maintain the bottom rail within the pocket, the corresponding bumps arranged and configured to enable the bottom rail to deploy from the pocket when the bottom rail is positioned within the predetermined or desired rotational range.

In one embodiment, the rotatable member is an outer roller of a dual roller unit, the dual roller unit further comprising an inner roller positioned within the outer roller, the covering is a second covering wrappable about the outer roller, the architectural-structure covering further comprising a first covering wrapped about the inner roller.

In one embodiment, the scoop is arranged and configured to maintain the bottom rail within the pocket when the rotatable member is not positioned within the predetermined or desired rotational range so that the bottom rail moves past a head rail assembly of the architectural-structure covering without contacting the head rail assembly.

In one embodiment, the predetermined or desired rotational range is between 8:00 and 12:00 for a rotatable member rotating in a counterclockwise direction.

In one embodiment, the predetermined or desired rotational range is between 9:00 and 11:00 for a rotatable member rotating in a counterclockwise direction.

In one embodiment, the predetermined or desired rotational range is between 12:00 and 4:00 for a rotatable member rotating in a clockwise direction.

In one embodiment, the predetermined or desired rotational range is between 1:00 and 3:00 for a rotatable member rotating in a clockwise direction.

In addition, and/or alternatively, in accordance with another feature of the present disclosure, an improved covering arranged and configured to be used in an architectural-structure covering is disclosed. In one embodiment, the architectural-structure covering includes a rotatable member and the covering. The rotatable member includes a front, room-facing surface and a rear surface opposite the front surface, the rear surface of the rotatable member being positioned closer to an underlying architectural-structure, in use, than the front, room-facing surface. The covering is operably coupled to the rotatable member, the covering being wrapped about and unwrapped from the rear surface of the rotatable member so that the covering can be moved between a retracted position and a fully deployed position.

In one embodiment, the covering includes a front vertical sheet having a height and width, a rear vertical sheet having a height and a width and operably coupled and moveable relative to the front vertical sheet, and a plurality of vanes extending between the front and rear sheets. Each vane includes a top layer, a bottom layer, a front edge, and a rear edge. Each vane is coupled to the front sheet along a first horizontal line of attachment and to the rear sheet along a second horizontal line of attachment. In the fully deployed position, the first horizontal line of attachment is spaced a vertical distance $D_1$ above the second horizontal line of attachment and the front edge is spaced a vertical distance from the first horizontal line of attachment and the rear edge is spaced is a vertical distance from the second horizontal line of attachment.

In one embodiment, in the fully deployed position, the vanes are orientated perpendicular to incoming sunrays.

In one embodiment, the front edge of the vane is positioned above the rear edge of the vane.

In one embodiment, the front edge is positioned adjacent to, and separate from, the front sheet, the rear edge is positioned adjacent to, and separate from, the rear sheet.

In one embodiment, the vane extends downward from the first horizontal line of attachment to the front edge and the vane extends upward from the second horizontal line of attachment to the rear edge.

In one embodiment, the distance from the first horizontal line of attachment to the front edge is a distance $D_2$ and the distance from the second horizontal line of attachment to the rear edge is a distance $D_3$, distance $D_2$ and distance $D_3$ being the same.

In one embodiment, distance $D_2$ and distance $D_3$ are between 1/16" to 3/8", and preferably 1/8" to 3/16".

In one embodiment, the distance from the first horizontal line of attachment to the front edge is a distance $D_2$ and the distance from the second horizontal line of attachment to the rear edge is a distance $D_3$, distance $D_2$ being different from distance $D_3$.

In one embodiment, distance $D_2$ and distance $D_3$ are between 1/16" to 3/8", and preferably 1/8" to 3/16".

In one embodiment, the front and rear sheets are manufactured from a transparent material, the vanes are manufactured from one of an opaque or partially opaque material.

In one embodiment, the front and rear sheets are manufactured from a sheer material.

In one embodiment, the covering is movable between a closed configuration and an open configuration, in the closed configuration, the front and rear sheets are positioned relatively close together and the vanes extend vertically in an approximately coplanar, contiguous relationship with the front and rear sheets, in the open configuration, the front and rear sheets are horizontally spaced apart from each other with the vanes extending between the front and rear sheets.

In one embodiment, the architectural-structure covering further comprises a booster or supplemental revolution assembly arranged and configured to operatively couple to the rotatable member to apply an additional torque to the rotatable member to further move the front sheet relative to the rear sheet.

In one embodiment, each vane is manufactured from an integral sheet of material.

Figure 1:
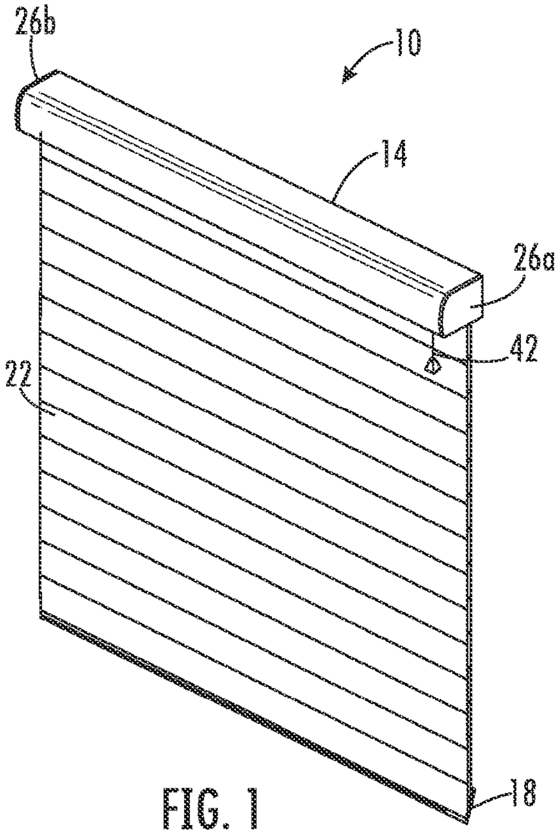
FIG. 1 (PRIOR ART)
FIG. 1 is a perspective view illustrating a known example of an embodiment of an architectural-structure covering, the architectural-structure covering including a first covering and a second covering, the first covering shown in a partially extended position, the first covering shown in a closed configuration.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

Various features, aspects, or the like of an architectural-structure covering will now be described more fully hereinafter with reference to the accompanying drawings, in which one or more features will be shown and described. It should be appreciated that the various features may be used independently of, or in combination, with each other. It will be appreciated that the various features as disclosed herein may be embodied in many different forms and should not be construed as being limited to the embodiments set forth herein. Rather, these embodiments are provided so that this disclosure will convey certain illustrations of the features to those skilled in the art.

Referring to FIGS. 7A-9, in accordance with one separate and distinct aspect of the present disclosure that may be used separately from, or in combination with, the other aspects of an architectural-structure covering disclosed herein (e.g., the separate and distinct aspect may be used in combination with the other features described herein (e.g., scoop and/or external booster), or may be used with a conventional architectural-structure covering having all or some of the features disclosed herein), an improved covering 110 for use in an architectural-structure covering 100 is disclosed.

As will be described in greater detail below, a covering according to the present disclosure includes a vertically suspended front sheet, a vertically suspended rear sheet, and a plurality of horizontally-extending, vertically-spaced flexible vanes. Each of the vanes may be secured along horizontal lines of attachments such as, for example, an adhesive line, to each of the front and rear sheets. As such, in use, the front and rear sheets and vanes may form a plurality of elongated, vertically-aligned, longitudinally-extending cells, which collectively may be referred to as a cellular panel. However, in contrast to known conventional coverings where, in the final, fully extended or deployed position, the vanes extend substantially horizontal between the front and rear sheets, in accordance with one or more features of the present disclosure, in the final, fully extended or deployed position, the covering is arranged and configured to be over-rotated so that the vanes are positioned substantially perpendicular to the incoming light (e.g., sunrays).

In one embodiment, the horizontal lines of attachment of the vanes to the front and rear sheets are spaced a distance from a front edge or portion of the vanes and a rear edge or portion of the vanes. Thus, the front and rear edges of the vanes are spaced a distance from the horizontal lines of attachment. Placement of the attachment (e.g., attachment lines or adhesion lines) of the vanes to the front and rear sheets (e.g., distancing or spacing the horizontal lines of attachments of the vanes from the front and rear ends of the vanes, respectively) also ensures that the layers (e.g., first top layer and second bottom layer) of each vane properly separate in the over-rotated position.

Thus arranged, the covering is arranged and configured so that in the open configuration of the fully extended position, the front edge of the vanes can be over-rotated relative to a position of the rear edge of the vanes such that the front edge of the vane is positioned vertically above the rear edge of the vane, the horizontal lines of attachment between the front sheet and the vanes reside above the placement of their attachment to the horizontal lines of attachment between the rear sheet and the vanes, and the front and rear edges of the vanes are spaced a distance from their respective horizontal lines of attachments thereby positioning the vanes substantially perpendicular to the incoming light (e.g., sunrays).

In one embodiment, during use, the covering may be coupled to and wrappable about a rotatable member so that rotation of the rotatable member in a first direction retracts the covering and rotation of the rotatable member in a second, opposite direction extends the covering. In accordance with one or more features of the present disclosure, the covering may be wrapped about or unwrapped from a rear side of the rotatable member, with a rear side of the rotatable member positioned between a front or room-facing side of the rotatable member and an associated underlying architectural structure (e.g., window side).

In use, the covering may be over-rotated by any suitable device, mechanism, system, method, etc. now known or hereafter developed. For example, in one embodiment, the architectural-structure covering may include a booster or supplemental revolution assembly operatively coupled with the rotatable member of the covering. In use, the booster or supplemental revolution assembly is operatively couple to the rotatable member of the covering to apply an additional torque or rotation to the rotatable member to further move, rotate, etc. the rotatable member when the covering reaches its fully deployed position (e.g., the booster or supplemental revolution assembly applies an additional torque to the rotatable member to provide additional rotation to the rotatable member and thus the covering). One example of an external booster or supplemental revolution assembly will be disclosed herein in connection with FIGS. 11-17B.

Referring to FIGS. 7A-8E, various views of an embodiment of an architectural-structure covering 100 including a covering 110 in accordance with one or more features of the present disclosure is shown. As shown and described herein, the architectural-structure covering 100 includes a rotatable member 105 operatively coupled to the covering 110. As illustrated, the covering 110 includes a front sheet 120, a rear sheet 140, and a plurality of vanes 160 extending between the front and rear sheets 120, 140.

As illustrated, the covering 110 may include a top edge or portion 112 operatively coupled to the rotatable member 105 and a bottom edge or portion operatively coupled to a bottom rail (not shown). In use, the front sheet 120 may be connected at connection point 122 to the rotatable member 105 and at another connection point to the bottom rail. Similarly, the rear sheet 140 may be connected at connection point 142 to the rotatable member 105 and at another connection point to the bottom rail. In use, as previously mentioned, rotation of the rotatable member 105 causes the covering 110 to wind and unwind (e.g., wrap and unwrap) about the rotatable member 105 so that the covering 110 moves between a retracted position and a deployed or extended position. As illustrated, in one embodiment, the covering 110 is arranged and configured to unwrap from a rear side of the rotatable member 105 (e.g., side positioned closer to the underlying architectural-structure (i.e., counterclockwise rotation of the rotatable member in FIGS. 8A-8E)).

In use, in the fully deployed or extended position, the covering 110 is movable from a closed configuration (depicted in FIGS. 7A and 8A) wherein the front and rear sheets 120, 140 of the covering 110 are relatively close together (e.g., the front and rear sheets 120, 140 are positioned directly adjacent to each other) and the vanes 160 extend vertically in an approximately coplanar, contiguous relationship with the front and rear sheets 120, 140, to an open configuration (depicted in FIGS. 7B-7E and 8B-8E), wherein the front and rear sheets 120, 140 are spaced apart from each other with the vanes 160 extending between the front and rear sheets 120, 140.

In contrast to conventional coverings including a front sheet, a rear sheet, and a plurality of vanes extending therebetween such as, for example, the first covering 22 shown in FIGS. 1-4 wherein in the fully deployed or extended position, the plurality of vanes extend substantially horizontally between the front and rear sheets, in accordance with one or more features of the present invention, in the fully deployed or extended position (FIGS. 7E and 8E), the plurality of vanes 160 are arranged and configured so that the vanes 160 are positioned substantially perpendicular to the incoming light (e.g., sunrays) L. Thus arranged, in use, a front portion or edge 162 of the vane 160 is positioned above a rear portion or edge 164 of the vane 160. That is, a front portion or edge 162 of a vane 160 may be rotated, or over-rotated, relative to a rear portion or edge 164 of the vane 160 so that, in the fully deployed position, the front portion or edge 162 of the vane 160 is positioned vertically above the rear portion or edge 164 of the vane 160 (e.g., the front portion or edge 162 of the vane 160 is positioned closer to the rotatable member 105 as compared to the rear portion or edge 164 of the vane 160) thereby enabling the vanes 160 to be positioned substantially perpendicular to the incoming light (e.g., sunrays) L.

Figure 9:
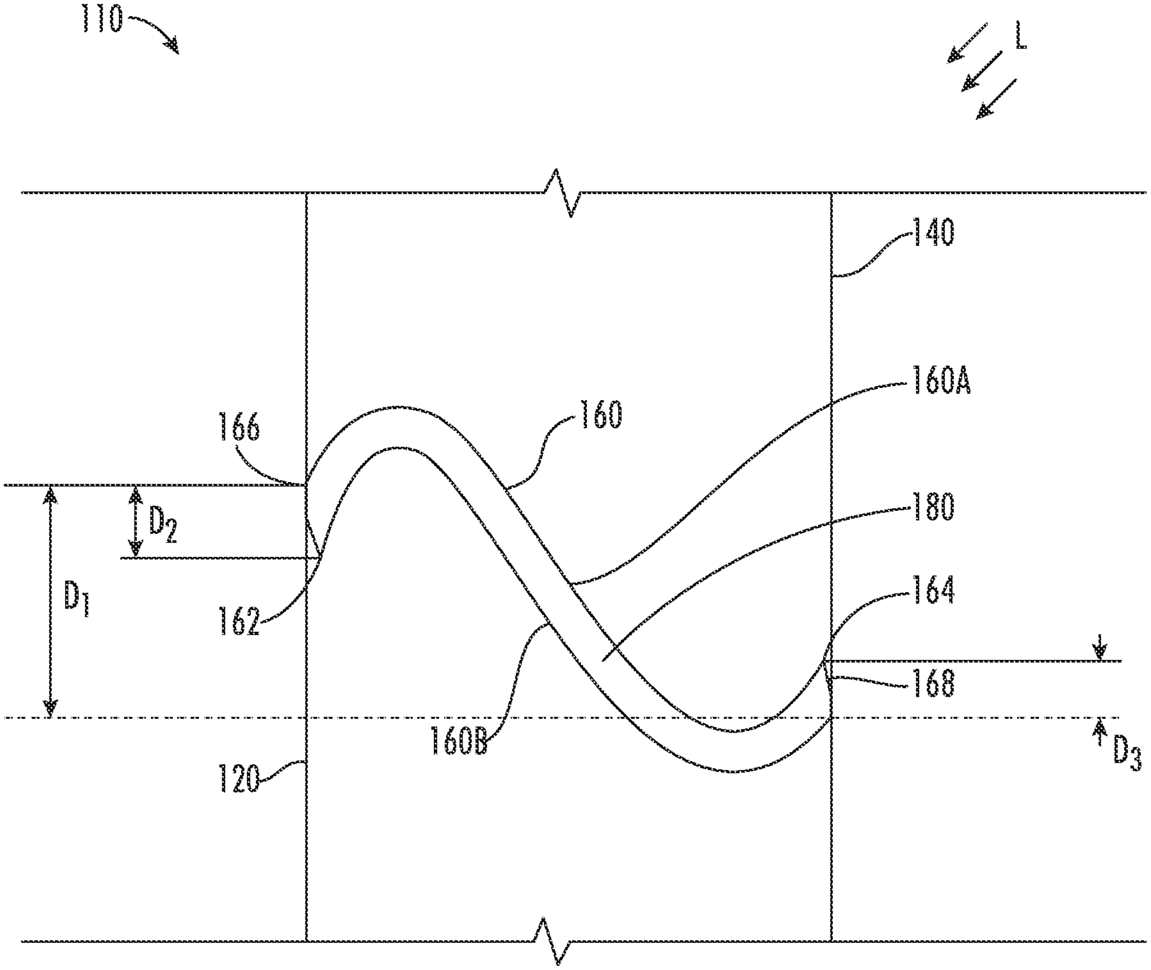
FIG. 9 illustrates an enlarged cross-sectional view of a portion of the covering of FIGS. 7A-7E in the fully deployed (e.g., over-rotated) position.

More particularly, as best illustrated in FIG. 9, the covering 110 may include a plurality of vanes 160 extending between the front and rear sheets 120, 140. As illustrated, in the open configuration, each of the vanes 160 define an opened cell 180. For example, as illustrated, in one embodiment, each cell 180 defines an enclosed area without requiring any portion of the front or rear sheets 120, 140. Thus each cell 180 may be constructed by an integral sheet of material. Alternatively, each cell 180 may be formed by multiple sheets of material coupled together. As illustrated, in one embodiment, each vane 160 includes first and second layers 160A, 160B (e.g., top and bottom layers). In use, the front and rear edges 162, 164 are defined by the joint, crease, coupling, etc. of the first and second layers 160A, 160B of the vanes 160. In one embodiment, each vane 160 may be formed as an integral piece of material with a fold at one edge and a slit, weld, joint, coupling etc. at the other end such as, for example, a fold at the front edge 162 and a slit, weld, joint, coupling etc. at the rear edge 164, or vice-versa. In use, the fold may also be arranged and configured to facilitate biasing of the cell 180 to the open configuration to provide improved aesthetics. In one embodiment, by utilizing double layers (e.g., first and second layers 160A, 160B) such as, for example, transparent layers, incoming light L is diffused eliminating, or at least greatly minimizing, harsh shadows (e.g., incoming light is diffused by the top layer and subsequently by the bottom layer).

With continued reference to FIG. 9, in accordance with one or more features of the present disclosure, each of the vanes 160 may be connected to the front sheet 120 along a first horizontal line of attachment 166 (e.g., an adhesive line) and to the rear sheet 140 along a second horizontal line of attachment 168 (e.g., vane 160 is coupled to the front sheet 120 along a first horizontal line of attachment 166 while the vane 160 is coupled to the rear sheet 140 along a second horizontal line of attachment 168). In use, placement of the first and second horizontal lines of attachment 166, 168 ensure that the first and second layers 160A, 160B of each vane 160 are separated in the open configuration. As illustrated, when the cells are in the fully open configuration, the first horizontal line of attachment 166 between the vane 160 and the front sheet 120 may be vertical spaced by a height or distance $D_1$ from the second horizontal line of attachment 168 between the vane 160 and the rear sheet 140. In one embodiment, the distance $D_1$ may be approximately 2.5 inches.

Moreover, as illustrated in FIG. 9, in the open configuration, the front edge 162 of each vane 160 is positioned adjacent to, but separated from, the front sheet 120 and the rear edge 164 is positioned adjacent to, but separated from, the rear sheet 140. In use, the first layer 160A may extend downward from the first horizontal line of attachment 166 to the front edge 162 of the vane 160. The second layer 160B may extend upwards from the second horizontal line of attachment 168 to the rear edge 164 of the vane 160. In one embodiment, the front edge 162 may be spaced a distance $D_2$ from or below the first horizontal line of attachment 166. The rear edge 164 may be spaced a distance $D_3$ from or above the second horizontal line of attachment 168. As such, by distancing the first and second horizontal lines of attachment 166, 168 from the front and rear edges 162, 164, respectively, the connection points to the front and rear sheets 120, 140 are positioned away from and therefore off-center from the front and rear edges 162, 164 of the vanes 160 thereby facilitating movement and control of the opening and closing of the cells 180. In one embodiment, distance $D_2$ and distance $D_3$ may be the same. Alternatively, distance $D_2$ and distance $D_3$ may be different. In one embodiment, distance $D_2$ and distance $D_3$ may be between ⅛" to 3/16", although this is but one configuration and different dimensions can be used such as, for example, between 1/16" to ¼", 5/16", ⅜", etc. In use, distance $D_2$ and distance $D_3$ can be based, in part, on a function of the flexibility of the materials used coupled with an objective aesthetic evaluation.

Thus arranged, in contrast to conventional coverings such as illustrated in FIGS. 1-4, in accordance with features of the present disclosure, the covering 110 is arranged and configured to be over-rotated so that the first horizontal line of attachment 166 with the front sheet 120 is positioned above the second horizontal line of attachment 168 with the rear sheet 140 and with the front and rear edges 162, 164 of the vanes 160 spaced a distance from the first and second horizontal line of attachments 166, 168, respectively. As such, in the fully deployed position, the vanes 160 may be positioned substantially perpendicular to the incoming light (e.g., sunrays) L.

In one embodiment, the final, fully deployed or extended position, the covering 110 may be supplementally rotated beyond a point at which conventional coverings are rotated. Thus, for example, when used in combination with a booster, such as, for example, an external booster as will be described in greater detail below, during the final stage of operation, the covering 110 may be supplementally rotated a predetermined amount (such as a final one-eighth revolution, one-quarter revolution, one-half revolution, three-quarters revolution, amounts therebetween, or other suitable amounts) as the covering 110 approaches the fully deployed or extended position so that the covering 110 is over-rotated as compared to conventional arrangements (e.g., as best illustrated by comparing FIGS. 7D and 8D to FIGS. 7E and 8E). For example, the booster may be configured to rotate the rotatable member 105 and thus the covering by approximately 330 degrees, although other ranges of rotation are envisioned.

In use, depending on the material(s) used in the manufacturing of the covering 110, opening and closing of the cells 180 may vary the light transmissivity of the covering 110, as will be described in greater detail below. For example, when the cells 180 are closed (FIGS. 7A and 8A), each cell 180 may be substantially compressed and the plurality of vanes 160 may be substantially parallel with each of the front and rear sheets 120, 140. In some embodiments, a length or body of each of the cells 180 may be adjacent to each other or partially overlap so that the cells 180 may form a pseudo middle sheet positioned between the front and rear sheets 120, 140. When the cells 180 are open to at least some extent (FIGS. 7B-7E and 8B-8E), each cell 180 may be at least partially angled with respect to at least one of the front and rear sheets 120, 140. In an open configuration, the cells 180 may then provide an insulative aspect by trapping air in each cell 180. Further, the cells 180 may reduce or diffuse shadows created by the structure of the covering 110 on one side from being as noticeable on the other side of the covering 110. In other words, shadow lines caused by light encountering the covering 110 on the outer side thereof, whether or not at a particular angle of incidence, may be reduced as viewed from the interior side of the covering 110.

In use, over-rotating the vanes 160 provides a "shading" attitude as the vane 160 is positioned more perpendicular relative to the incoming light (e.g., sunrays) L (e.g., inside-edge of the vane is tilted above horizontal). Thus, in the fully deployed position, the covering 110 is oriented to allow light to be admitted through the gaps or spaces between the cells 180. In accordance with one or more features of the present disclosure, by enabling the covering 110 to over-rotate so that the vanes of the covering are orientated substantially perpendicular to the incoming light (e.g., sunrays) L, in the fully deployed position, the vanes 160 are arranged and configured to provide optimal positioning while avoiding, or at least minimizing, shadows below the vanes.

That is, in use, the structure of the cells 180 of the vanes 160 diffuses shadows formed from light transmitted through the covering 110. In accordance with the present disclosure, shadows may be substantially prevented from being transmitted through the covering even in the open configuration of the fully extended position. This may be especially apparent in examples where the front sheet 120 and the rear sheet 140 are a transparent or sheer material, or otherwise have a high light transmissivity.

In conventional coverings, during use, as light encounters the rear sheet (e.g., if the covering is positioned over a window), the light may be transmitted through the rear sheet and the horizontal line of attachment may block part of the light. However, other light rays may pass through the rear sheet without be blocked, thus resulting in shadow lines (e.g., the light being blocked by the horizontal line of attachment may form a shadow). Thereafter, as the vane is positioned above the shadow, the shadow may be transmitted to the front sheet of the covering and may be visible on the front side or surface of the covering. In use, the shadow may appear black and/or darkened portions or spots of the front side of the covering, which may be aesthetically unpleasing. Additionally, the spots may cause the material of the front sheet to fade unevenly due to light exposure.

In contrast, in accordance with features of the present disclosure, by positioning the vanes 160 substantially perpendicular to the incoming light L, the covering 110 of the present disclosure eliminates, or at least minimizes, darkened spots due to harsh shadows.

In use, the fully deployed position of the covering may be associated with a final revolution of the rotatable member so that further rotation of the rotatable member repositions at least a portion of the covering. For example, further rotation of the rotatable member over-rotates the covering such that, for example, the front edge 162 of the vane 160 coupled to the front sheet 120 is rotated, or over-rotated, to a position above the rear edge 164 of the vane 160 coupled to the rear sheet 140 so that, in the fully deployed position, the front edge 162 of the vane 160 is positioned above the rear edge 164 of the vane 160.

While the covering 110 of the present disclosure has been shown and described in the present disclosure for use with a particular architectural-structure covering, it should be appreciated that the covering 110 should not be limited to any particular type of architectural-structure covering. It is envisioned that the covering 110 according to one or more features of the present disclosure may be used in connection with other types of architectural-structure coverings. Thus, the present disclosure should not be limited to any particular type of architectural-structure covering unless specifically claimed. For example, the covering 110 may be used in an architectural-structure covering including dual rotatable members and dual coverings as illustrated in FIGS. 1-4. Alternatively, the covering 110 may be used in an architectural-structure covering including a single rotatable member and covering.

The covering including the front sheet, the rear sheet, and the vanes may be manufactured from any suitable material now known or hereafter developed. For example, the covering may be constructed from natural and/or synthetic materials, including fabrics, polymers, and/or other suitable materials. Fabric materials may include woven, non-woven, knits, or other suitable fabric types. Additionally, the front sheet, rear sheet, and vanes may have varying translucent properties, varying from blackout, opaque, to partially opaque, or clear. In some instances, the front sheet and the rear sheet may have an increased light translucence as compared with the vanes, so that when the vanes are closed the light translucence of the covering may be varied. For example, the front and rear sheets may be made from a transparent or sheer material while the vanes may be manufactured from a transparent, a blackout, an opaque, or a partially opaque material.

In one embodiment, when used in combination with a second covering, the first and second coverings may have different levels of light transmissivity. For example, the first and second coverings may be constructed of transparent, translucent, and/or opaque materials to provide a desired ambience or decor in an associated room. In one embodiment, the first covering includes front and rear sheets that are transparent and/or translucent, and vanes that are translucent and/or opaque. In some examples, the second covering is made of a single sheet of material with zero light transmissivity, often referred to as a black-out shade. The second covering may include patterns or designs so that when the second covering is extended behind the first covering, the second covering creates a different aesthetic appearance than the first covering by itself.

Referring to FIGS. 10A-10E, in accordance with another separate and distinct aspect of the present disclosure that may be used separately from, or in combination with, the other aspects of an architectural-structure covering disclosed herein (e.g., the separate and distinct aspect may be used in combination with the other features described herein (e.g., covering and/or external booster), or may be used with a conventional architectural-structure covering having all or some of the features disclosed herein), an improved rotatable member 200 for use in an architectural-structure covering is disclosed.

While features of the rotatable member will be shown and described in the present disclosure for use with an outer roller of a dual roller unit, it should be appreciated that the features of the rotatable member should not be limited to any particular type of rotatable member. For example, it is envisioned that the features of the rotatable member may be used in connection with other types of rotatable member for use with architectural-structure coverings. Thus, the present disclosure should not be limited to an outer roller of a dual roller unit unless specifically claimed.

Referring to FIGS. 10A-10E, an example of an embodiment of a rotatable member 200 for use in an architectural-structure covering such as, for example, architectural-structure covering 10, is disclosed. In one embodiment, the rotatable member 200 may be arranged and configured as an outer roller in a dual roller unit. Thus, in use, the rotatable member 200 may be arranged and configured to replace the outer roller 70 in dual roller unit 50, and may be interchangeably referred to herein as a rotatable member 200 or an outer roller 200.

In accordance with one or more features of the present disclosure, the outer roller 200 includes a scoop 210 arranged and configured to create a cradle or pocket 220 to position, maintain, hold, secure, etc. (terms used interchangeably herein without the intent to limit) the bottom rail 20 of the second covering 24 so that the bottom rail 20 is prevented from dropping, deploying, releasing, separately, etc. (terms used interchangeably herein without the intent to limit) from the outer roller 200 until the second covering 24 is properly positioned to be deployed. As such, in use, the scoop 210 is arranged and configured to prevent, or at least minimize, premature deployment, or uncontrolled or unplanned deployment, of the bottom rail 20 and the second covering 24. For example, in one embodiment, the scoop 210 prevents, or at least inhibits, separation of the bottom rail 20 from the outer roller 200 and thus prevents, or at least inhibits, the bottom rail 20 from contacting the head rail assembly 14.

Figure 6A:
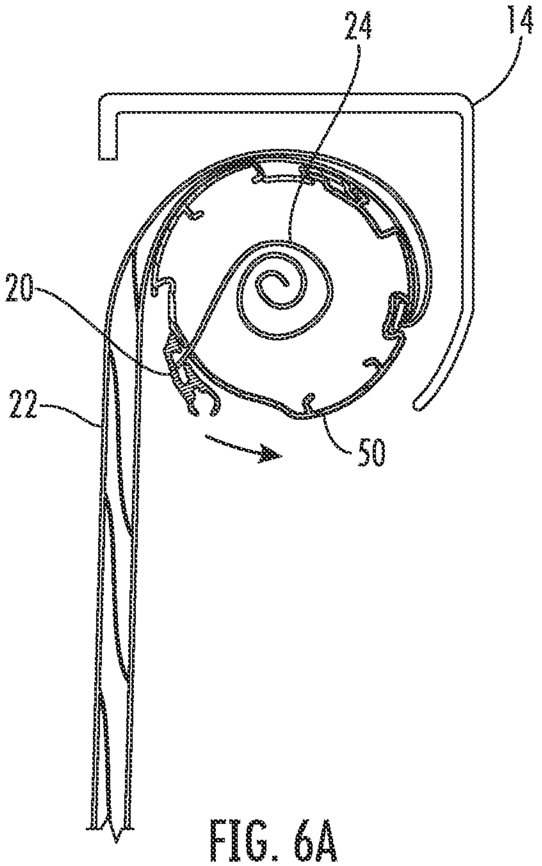
FIG. 6A (PRIOR ART)
FIGS. 6A and 6B schematically illustrate operation of the dual roller unit of FIG. 5.
Figure 6B:
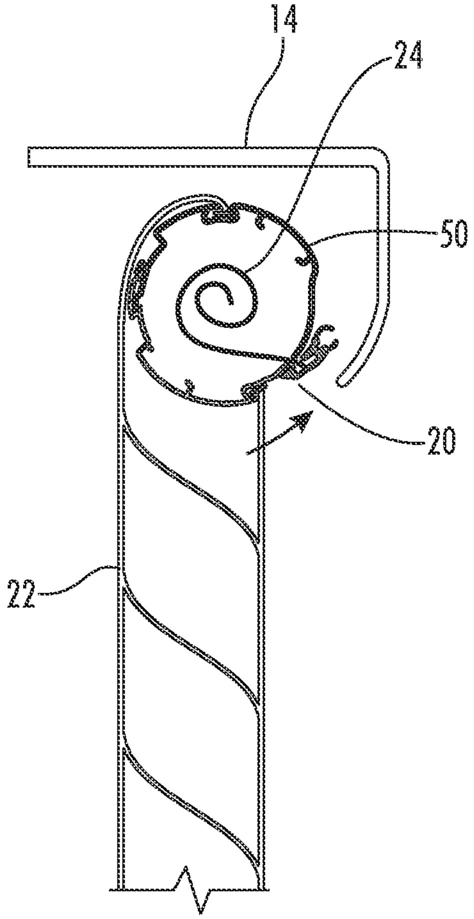
FIG. 6B (PRIOR ART)
Figures 7A, 7B, 7C, 7D, 7E:
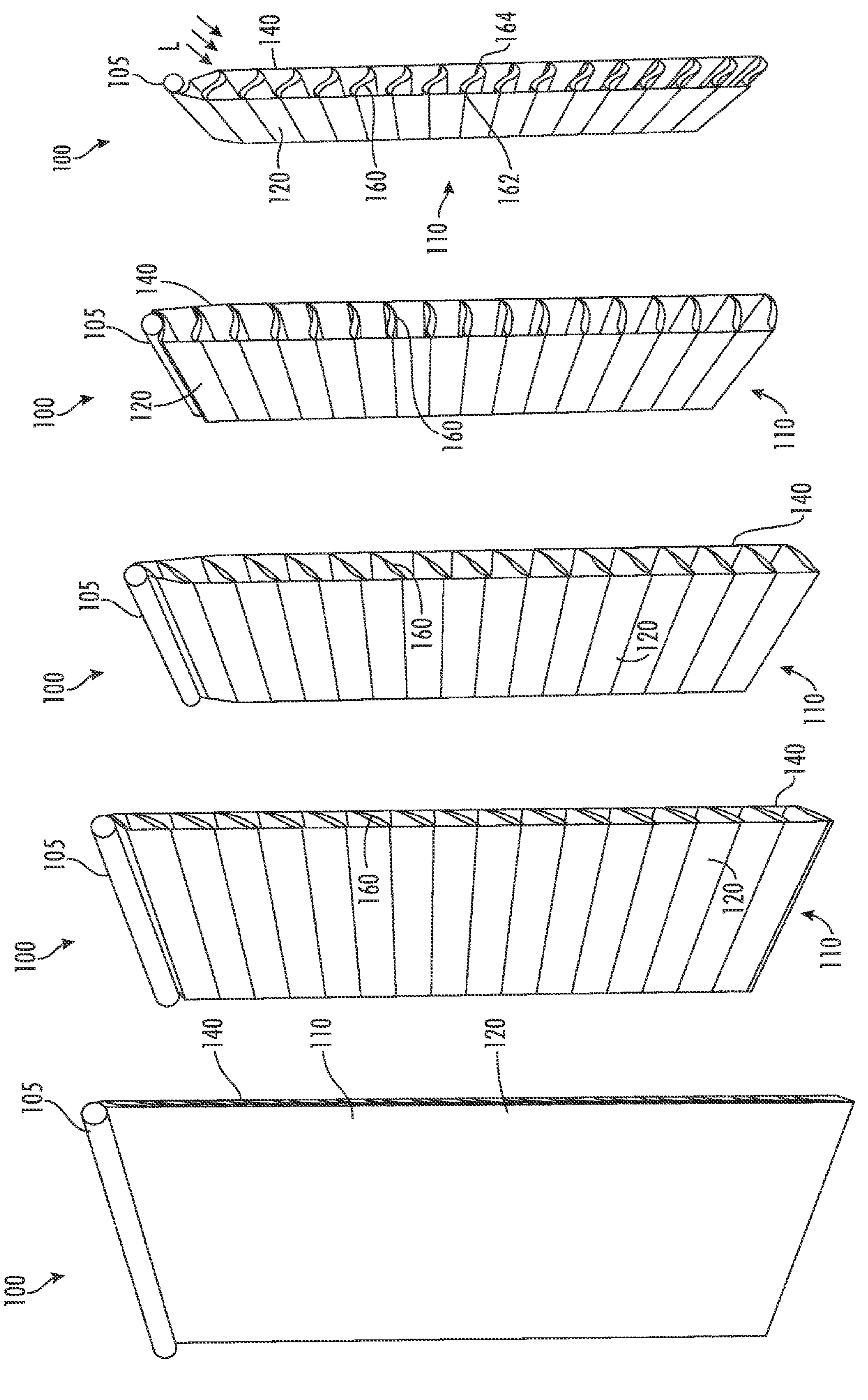
FIGS. 7A-7E illustrate various perspective views of an embodiment of a covering in accordance with one or more features of the present disclosure, the covering may be used in connection with the architectural-structure covering of FIG. 1 (e.g., the covering may be used in place of the first covering of FIG. 1)
Figures 8A, 8B, 8C, 8D, 8E:
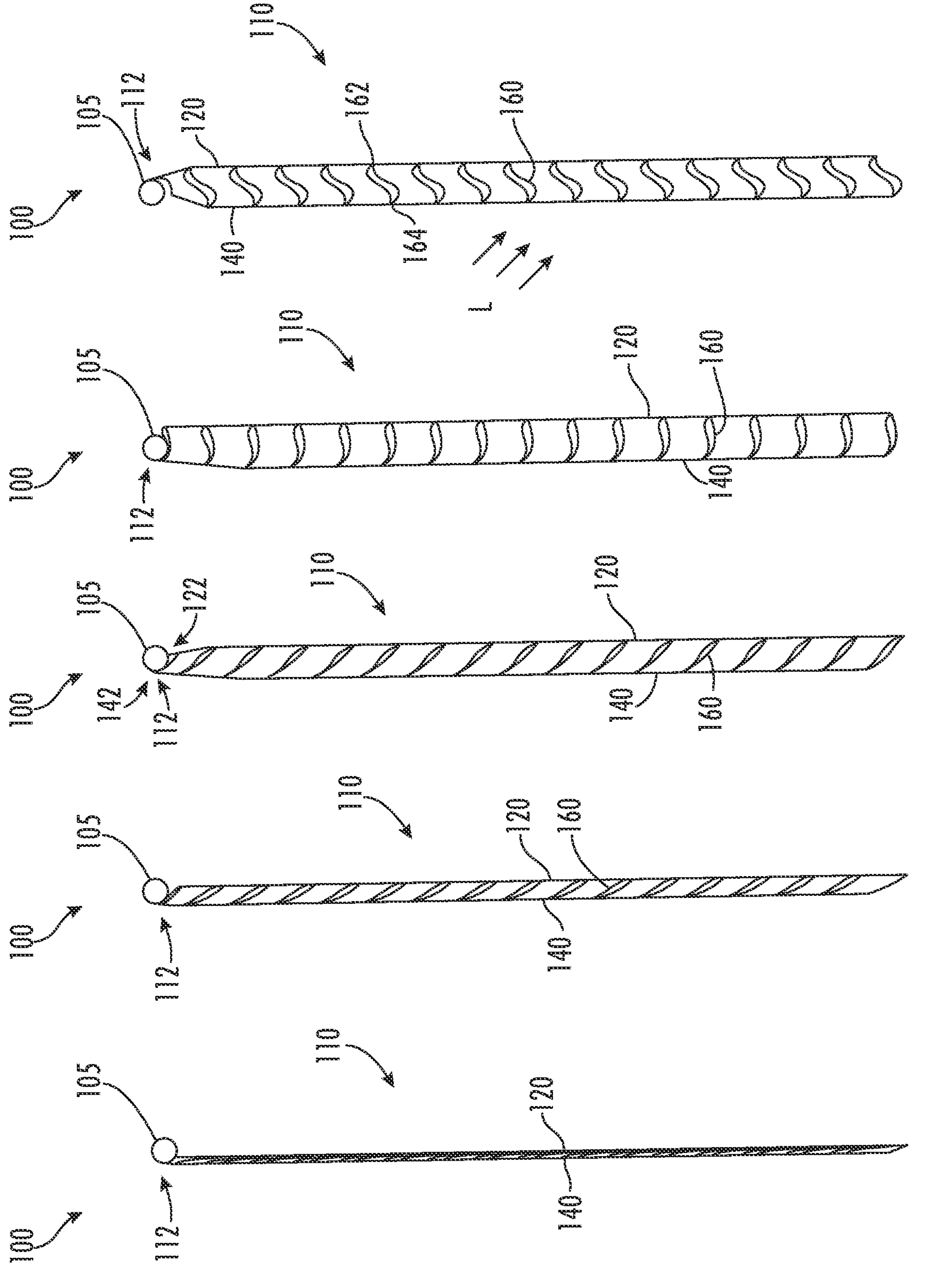
FIGS. 8A-8E illustrate various cross-sectional views of the covering of FIGS. 7A-7E.

In use, the scoop 210 enables the bottom rail 20 to reside within the cradle or pocket 220 as the outer roller 200 is rotated. That is, the scoop 210 takes up any slack in the second covering 24 caused by rotation of the inner roller while the outer roller remains stationary. That is, as previously discussed, in the second from last rotation of the outer roller, the first covering 22 is fully deployed and, as such, the bottom rail 20 of the second covering 24 is revealed (e.g., no longer wrapped by any portion of the first covering 22). Thus, the bottom rail 20 of the second covering 24 can separate or deploy from the outer roller. However, deployment of the second covering 24 should be maintained until the bottom rail 20 of the second covering 24 reaches a predetermined, desired position. For example, in one embodiment, deployment of the second covering 24, and thus of the bottom rail 20, from the outer roller should not occur until the bottom rail 20 reaches a predetermined or desired position. In one embodiment, for rotatable members rotating in the counterclockwise position, the predetermined or desired position may be approximately 12:00 to 8:00, preferably 11:00 to 9:00 (when viewed in FIGS. 6A and 6B with the underlying architectural-structure on the left). As will be appreciated, for rotatable members rotating in the clockwise position, the predetermined or desired position may be approximately 12:00 to 4:00, preferably 1:00 to 3:00 (when viewed in FIGS. 6A and 6B with the underlying architectural-structure on the left). Thus, in use, the scoop 210 is arranged and configured to allow the bottom rail 20 of the second covering 24 to deploy when positioned within the predetermined or desired range of positions, but prevent, or at least inhibit, the bottom rail 20 of the second covering 24 when outside of the predetermined or desired range of position. That is, the scoop 210 is arranged and configured to prevent unintended, premature deployment of the bottom rail. For example, the scoop 210 is arranged and configured to prevent premature deployment of the bottom rail 20 of the second covering 24, which may cause the bottom rail 20 to contact the head rail assembly 14 resulting in unwanted noise, unintended damage, or a combination thereof, as schematically shown in FIGS. 6A and 6B. Thus arranged, for example, the scoop 210 prevents the bottom rail 20 of the second covering 24 from deploying initially when the first covering 22 is fully deployed. In this manner, the scoop 210 holds the bottom rail 20 of the second covering 24 in position so that the bottom rail 20 of the second covering 24 may pass by the head rail assembly 14 without contacting the head rail assembly 14. Thereafter, upon subsequent rotation of the outer roller 200, the scoop 210 enables the bottom rail 20 to deploy.

In one embodiment, as illustrated in FIGS. 10A-10E, the scoop 210 includes a first arm or portion 230 and a second arm or portion 240. The first arm or portion 230 may extend away from the outer roller 200 (e.g., the first arm or portion 230 extends away from an outer surface 202 of the outer roller 200). The second arm or portion 240 extends at an angle relative to the first arm or portion 230. For example, in one embodiment, the scoop 210 may include an "L" or "C" shape, although this is but one configuration. Thus arranged, the scoop 210 defines the cradle or pocket 220 between the outer surface 202 of the outer roller 200 and an inner surface 242 of the second arm or portion 240 and inner surface 232 of the first arm or portion 230. The cradle or pocket 220 can be arranged and configured to hold the bottom rail 20 in close proximity to the outer roller 200 so that, during rotation, the bottom rail 20 is prevented from premature deployment so that, for example, during rotation, the bottom rail 20 may pass by the head rail assembly 14 without contacting thereof (e.g., scoop 210 creates a pocket or cradle to allow slack in the second covering 24 while not allowing the bottom rail 20 to deploy from the outer roller 200).

During rotation of the outer roller 200, and hence the scoop 210, the scoop 210 includes an opening 222 in communication with the cradle or pocket 220. The opening 222 can be oriented in the direction of rotation of the outer roller 200 so that, when positioned within the predetermined or desired range, the bottom rail 20 of the second covering 24 may deploy from the cradle or pocket 220 via the force of gravity.

Figure 10A:
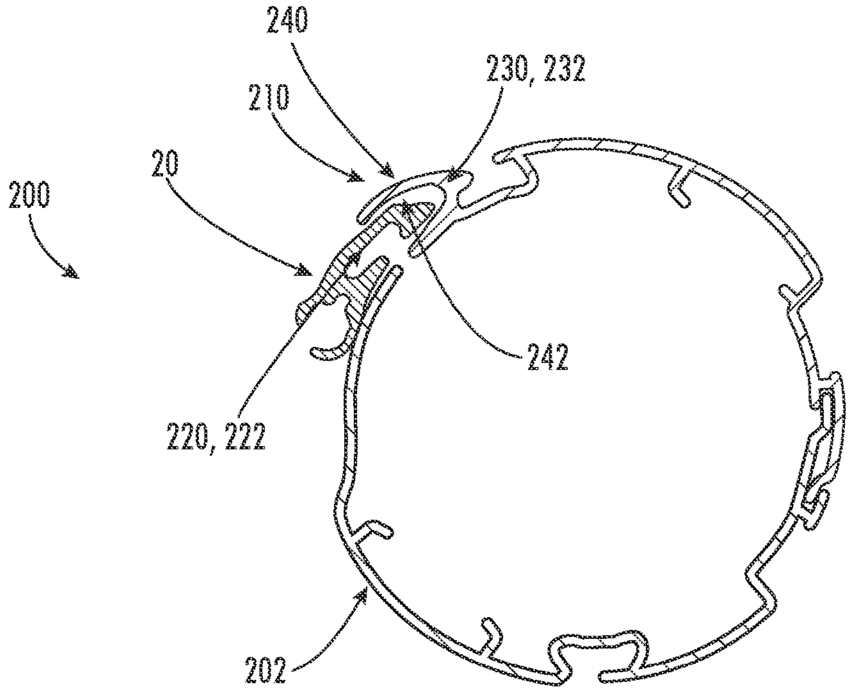
FIGS. 10A-10E are various cross-sectional views illustrating an outer roller that may be used with the dual roller unit of FIG. 5, the outer roller including a scoop in accordance with one or more features of the present disclosure.
Figure 10B:
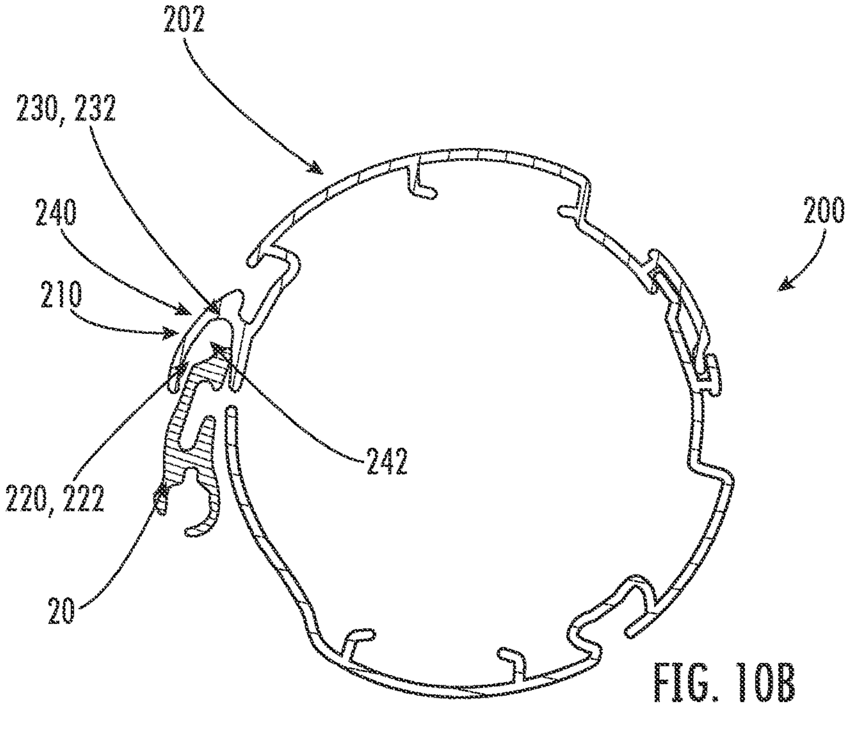
Figure 10C:
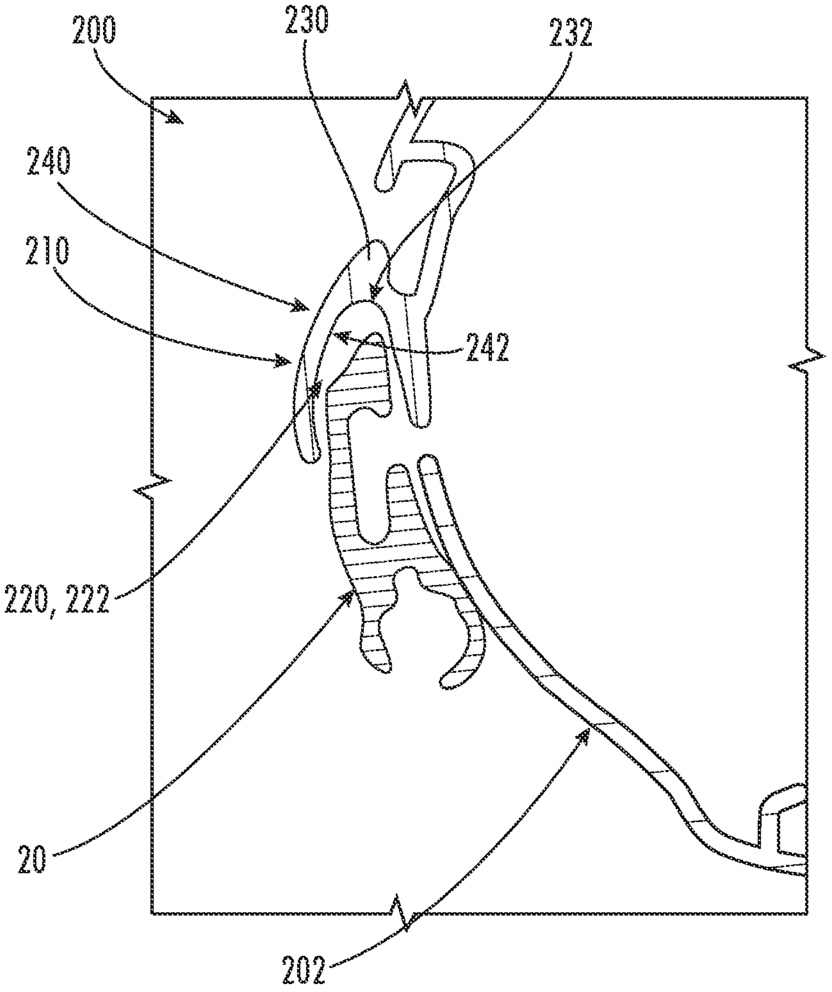
Figure 10D:
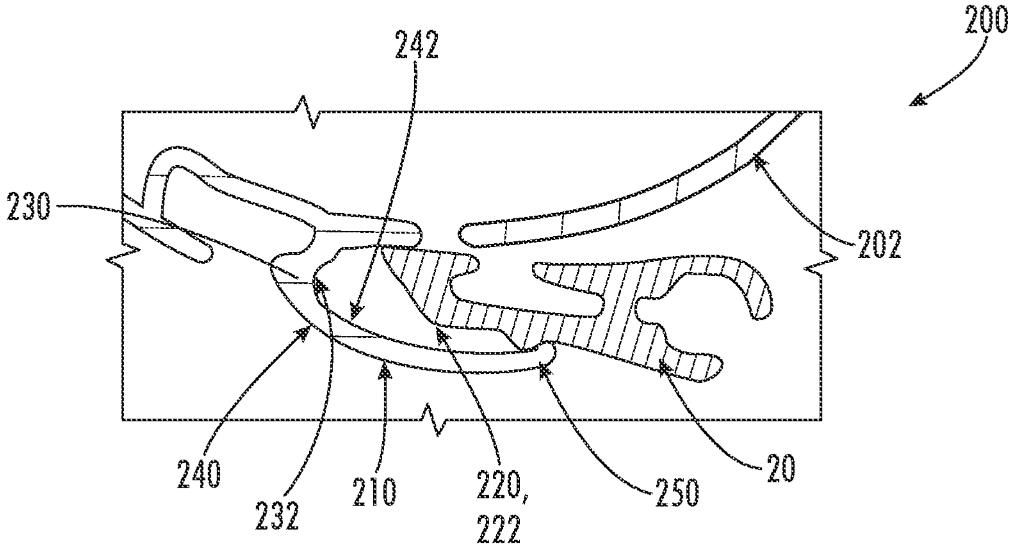
Figure 10E:
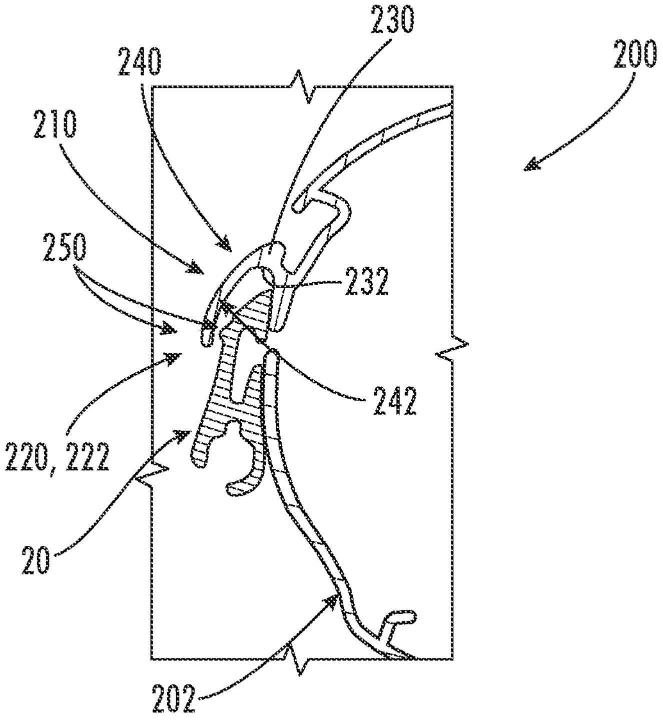

In one embodiment, the scoop 210 and the bottom rail 20 may include corresponding bumps, projections, or the like 250, to maintain the bottom rail 20 within the cradle or pocket 220. Thus arranged, during use, as illustrated in FIG. 10D, when the bottom rail 20 is positioned outside of the predetermined or desired range, the corresponding bumps 250 formed on the scoop 210 and the bottom rail 20 contact, engage, etc. with each other to prevent the bottom rail 20 from slipping out of the cradle or pocket 220. For example, as illustrated in FIG. 10D, with the bottom rail 20 positioned at substantially 6:00 (when viewed with the underlying architectural-structure on the left and with the rotatable member rotating counterclockwise), the corresponding bumps 250 formed on the scoop 210 and the bottom rail 20 contact, engage, etc. with each other to prevent deployment of the bottom rail 20. However, as illustrated in FIG. 10E, when the bottom rail 20 is positioned within the predetermined or desired range, the bottom rail 20 aligns itself relative to the scoop 210 so that the corresponding bumps 250 do not contact, engage, etc. thereby enabling the bottom rail 20 to deploy from the outer roller 200. For example, as illustrated in FIG. 10E, with the bottom rail 20 positioned at substantially 9:00 (when viewed with the underlying architectural-structure on the left and with the rotatable member rotating counterclockwise), the corresponding bumps 250 formed on the scoop 210 and the bottom rail 20 do not contact, engage, etc. with each other to enable deployment of the bottom rail 20.

In one non-limiting example embodiment, the architectural-structure covering may include a covering arranged and configured to be over-rotated so that the front portion of the vanes may be positioned above the rear portion of the vanes so that the vanes are positioned substantially perpendicular to the incoming sunrays as previously described. The architectural-structure covering may also include a booster such as, for example, an external booster as will be described in greater detail herein, to provide supplemental rotation to facilitate a fully deployed condition (e.g., over-rotation of the vanes). In use, the scoop may be positioned and timed with the booster to pick up any slack in the second covering. That is, during deployment of the first covering, the inner and outer rollers rotate in unison. However, with the first covering fully extended but prior to firing or activation of the booster, a brief time delay may occur when the inner roller continues to rotate but before the booster fires to rotate the outer roller (e.g., milli-seconds), which may result in movement of the inner roller relative to the outer roller (e.g., approximately 1/16" or more of rotation) causing the second covering to begin deploying from the inner roller. Generally speaking, this may cause slack in the second covering, which may cause the bottom rail of the second covering to separate from the outer roller and thus contact the head rail assembly. However, by properly positioning the scoop on the outer roller and timing the position of the scoop with the firing of the booster, the scoop is arranged and configured to maintain the position of the bottom rail of the second covering accommodating for the slack in the second covering so that the bottom rail of the second covering may pass through the head rail assembly. Thereafter, the bottom rail may slip from the scoop and deploy.

Referring to FIGS. 11-17B, in accordance with another separate and distinct aspect of the present disclosure that may be used separately from, or in combination with, the other aspects of an architectural-structure covering disclosed herein (e.g., the separate and distinct aspect may be used in combination with the other features described herein (e.g., covering and/or scoop), or may be used with a conventional architectural-structure covering having all or some of the features disclosed herein), an external booster for use in an architectural-structure covering is disclosed.

As will be described in greater detail below, an external booster according to the present disclosure may be arranged and configured to operatively engage the covering of an architectural-structure covering. For example, the external booster may be coupled via one or more gears to an end of a rotatable member associated with the covering. In use, the external booster may be arranged and configured to transition from a first configuration to a second configuration. In the first configuration, the external booster may be arranged and configured to store potential energy. In the second configuration, the external booster may be arranged and configured to release the stored potential energy in the form of kinetic energy. The external booster may be arranged and configured to transition from the first configuration to the second configuration at a predetermined covering position during extension or deployment of the covering. In use, the kinetic energy may be utilized to rotate the rotatable member in a specific direction to effect full extension or deployment of the covering.

Figure 11:
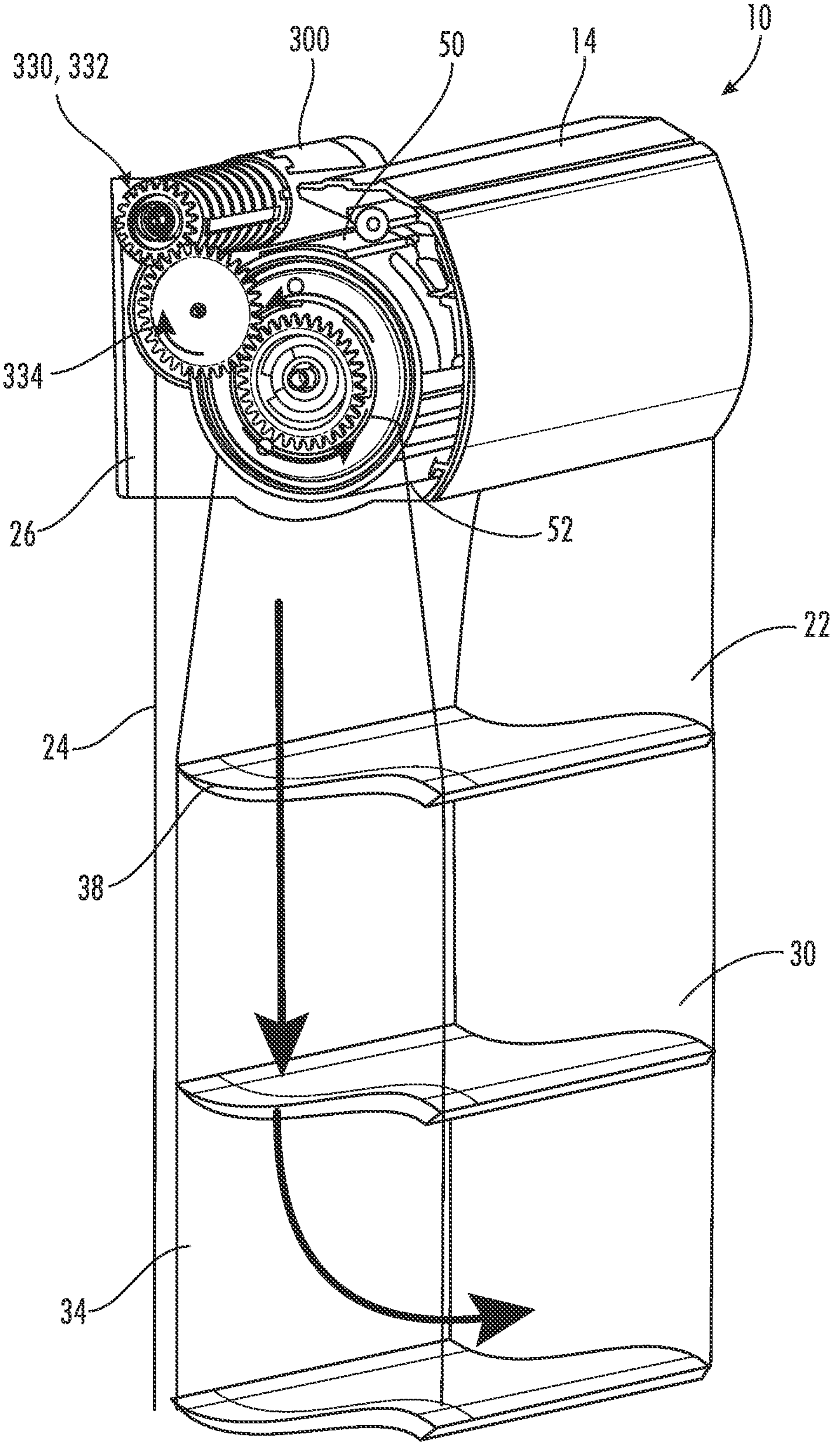
FIG. 11 is a detailed, perspective view of a portion of the architectural-structure covering of FIG. 1 incorporating an example of an embodiment of an external booster in accordance with one or more aspects of the present disclosure.
Figure 12:
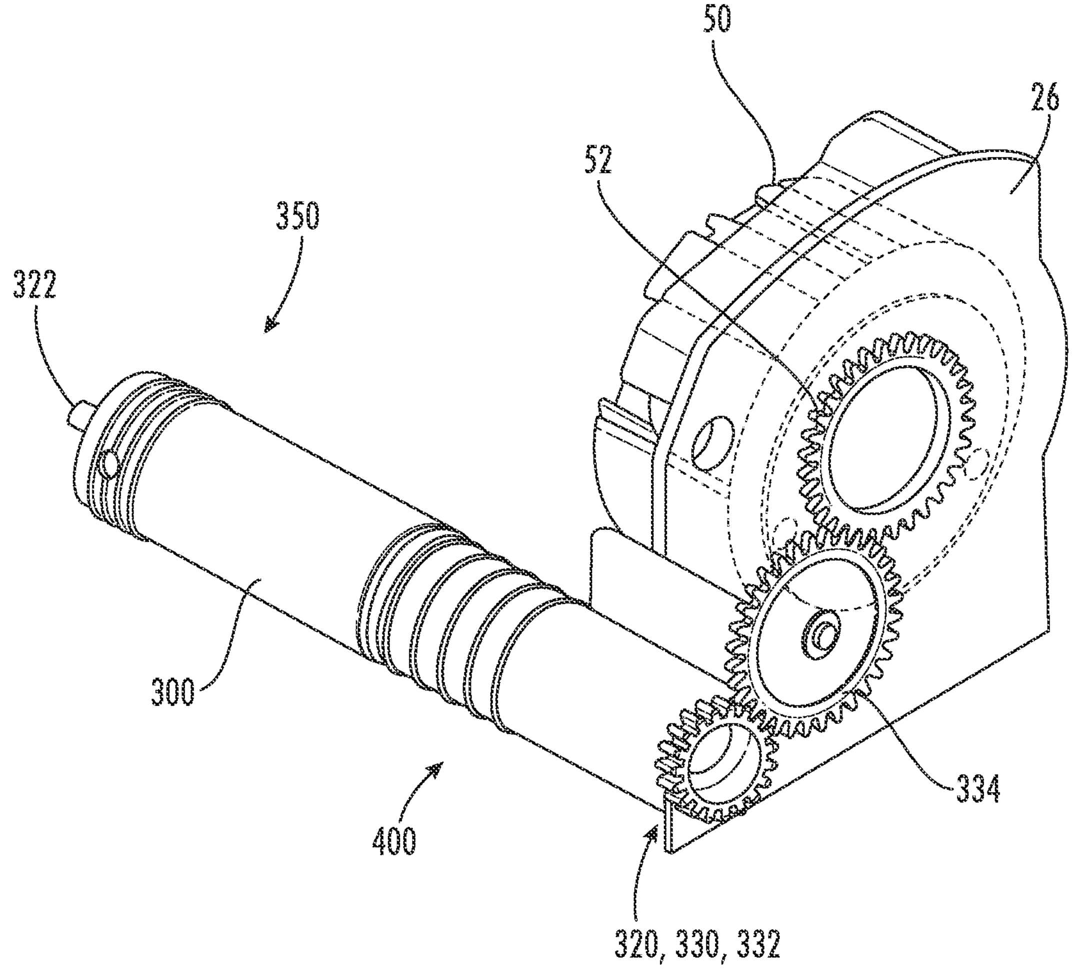
FIG. 12 is a reverse perspective view of the external booster shown in FIG. 11, the external booster coupled to the architectural-structure covering of FIG. 1.
Figure 13:
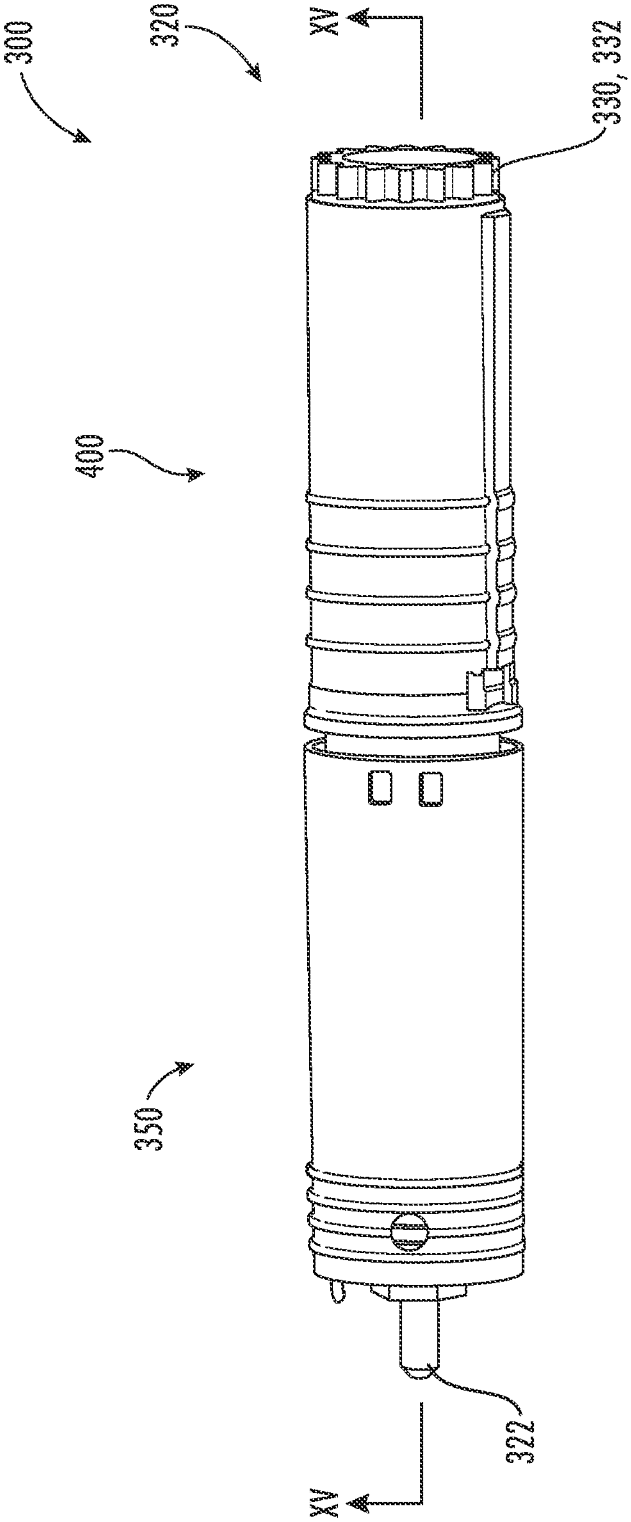
FIG. 13 is a side view of the external booster shown in FIG. 11.

Referring to FIG. 11, an example of an embodiment of an architectural-structure covering such as, for example, architectural-structure covering 10, including an external booster 300 in accordance with one or more aspects of the present disclosure is shown. As shown and described herein, the external booster 300 is arranged and configured to work in conjunction with an architectural-structure covering 10. In particular, certain aspects of the external booster 300 have been arranged and configured so that the external booster 300 may be used in connection with a dual roller unit for operatively moving first and second coverings such as, for example, first and second coverings 22, 24. In particular, the covering, such as, for example, the first covering 22, may include a front sheet 30, a rear sheet 34, and a plurality of vanes 38 extending between the front and rear sheets 30, 34, as previously described. As previously mentioned, in the fully deployed or extended position, the first covering 22 is movable from a closed configuration (depicted in FIG. 1) wherein the front and rear sheets 30, 34 of the first covering 22 are relatively close together (e.g., the front and rear sheets 30, 34 are positioned directly adjacent to each other) and the vanes 38 extend vertically in an approximately coplanar, contiguous relationship with the front and rear sheets 30, 34, to an open configuration (depicted in FIG. 2), wherein the front and rear sheets 30, 34 are horizontally spaced apart from each other with the vanes 38 extending substantially horizontally therebetween. In one embodiment, the external booster 300 may be used with a covering arranged and configured to over-rotate as previously described herein in connection with FIGS. 7A-9.

In use, movement of the first covering 22 from the retracted position to a partially extended position to the fully extended position, wherein the first covering 22 is transitioned from the closed configuration to the open configuration, may occur, for example, via gravity. As such, the motion of the covering 22 may not be controlled or driven. In such instances, variations due to the size and weight of the covering 22 may exist, which may adversely affect the appearance of the architectural-structure covering 10. In addition, in one or more embodiments, over-rotation of the covering 22 in the open configuration may be desired. For example, in one or more embodiments, it may be aesthetically desirable to have a front edge of a vane coupled to the front sheet rotated, or over-rotated, to a position above a rear edge of the vane coupled to the rear sheet so that, in the fully deployed position, the front edge of the vane is positioned above the rear edge of the vane rotate as previously described herein in connection with FIGS. 7A-9. In either event, the external booster 300 may be utilized to operatively couple to the covering 22 such as, for example, the rotatable member 50 (e.g., the outer roller 70 of a dual roller unit 50) of the covering 22 to apply an additional torque or rotation to the rotatable member 50 to move, rotate, etc. the rotatable member 50 so that the covering 22 reaches its fully deployed position (e.g., the external booster 300 applies an additional torque to the rotatable member 50 to provide additional rotation to the rotatable member 50 to ensure that the covering 22 opens and travels to a limit stop as desired).

While the external booster 300 is shown and described in the present disclosure for use with a particular covering, it should be appreciated that the external booster 300 should not be limited to any particular type of architectural-structure covering. It is envisioned that the external booster 300 according to one or more aspects of the present disclosure may be used in connection with other types of architectural-structure coverings. Thus, the present disclosure should not be limited to any particular type of architectural-structure covering unless specifically claimed.

Referring to FIGS. 11-15, as will be described in greater detail herein, the external booster 300 may include an anchoring and/or coupling mechanism 320, a biasing mechanism 350, and a retention mechanism 400.

As will be described in greater detail, in use, the anchoring or coupling mechanism 320 is arranged and configured to secure the external booster 300 to the architectural-structure covering 10. For example, the anchoring or coupling mechanism 320 may include a shaft 322 for engaging one of the end caps 26 of the architectural-structure covering 10. By engaging the end cap 26 of the architectural-structure covering 10, the external booster 300 is arranged and configured to be positioned outside or exterior to the rotatable member 50. Thus arranged, the external booster 300 also includes one or more coupling mechanisms 330 for rotatably engaging the rotatable member 50. For example, the external booster 300 may include one or more gears 332 for engaging a gear 52 associated with the rotatable member 50.

The biasing mechanism 350 may be preloaded with a resilient force and may remain in a preloaded state until the covering 22 reaches a predetermined extended position (e.g., the fully deployed position). That is, the biasing mechanism 350 may be arranged and configured so that when the external booster 300 is in the first configuration, the biasing mechanism 350 is preloaded with a resilient force. Thereafter, when the external booster 300 is transitioned to the second configuration, the biasing mechanism 350 is arranged and configured to release its preloaded resilient force, which in turn causes the retention mechanism 400 to rotate, which causes the rotatable member 50, and hence the covering 22 associated therewith, to rotate.

The biasing mechanism 350 may include a biasing member 352 (such as a compression spring, an extension spring, a torsion spring, etc.) or any other suitable energy storage member, thus the biasing member 352 may be interchangeably referred to herein as a spring 352. In use, the predetermined extended position of the covering 22 (e.g., the point at which the external booster 300 may be configured to transition from the first configuration to the second configuration) may be associated with a final revolution of the rotatable member 50 so that further rotation of the rotatable member 50 repositions at least a portion of the covering 22. For example, further rotation of the rotatable member 50 may laterally separate a Silhouette® shade (e.g., cause the covering 22 to move from the closed configuration to the open configuration as previously described in connection with FIGS. 1 and 2). Alternatively, for example, further rotation of the rotatable member 50 may over-rotate the covering 22 such that, for example, the front edge of the vane coupled to the front sheet is rotated, or over-rotated, to a position above the rear edge of the vane coupled to the rear sheet so that, in the fully deployed position, the front edge of the vane is positioned above the rear edge of the vane (e.g., over-rotating the vanes provides a "shading" attitude as the vane is positioned more perpendicular relative to the sun (inside-edge of the vane is tilted above horizontal)), as previously described herein in connection with FIGS. 7A-9. In one embodiment, the biasing member 352 may be preloaded by rotating a first end of the biasing member 352 relative to a second end of the biasing member 352, thereby imparting a preload on the biasing member 352. The preloaded biasing member 352 may be biased in the extension direction.

The retention mechanism 400 may be configured to retain the potential energy or preload in the biasing mechanism 350 until the covering 22 reaches the predetermined extended position. The retention mechanism 400 may be selectively associated with the anchoring mechanism 320 to either restrict or permit movement of the biasing mechanism 350. When associated with the anchoring mechanism 320 (e.g., when the external booster 300 is in the first configuration), the retention mechanism 400 may restrict movement of the biasing mechanism 350, thereby maintaining the preload in the biasing mechanism 350. When not associated with the anchoring mechanism 320 (e.g., when the external booster 300 is in the second configuration), the retention mechanism 400 may permit movement of the biasing mechanism 350, thereby enabling conversion of the stored potential energy into kinetic energy, which may affect rotation of the rotatable member 50 and further movement (e.g., extension) of the covering 22 to the fully deployed position.

During use, at least a portion or an element of the retention mechanism 400 may be movable between a first position and a second position. For example, the retention mechanism 400, or at least a portion or element thereof, may be slidable, pivotable, and/or rotatable between the first and second positions. Movement of the retention mechanism 400, or at least a portion or element thereof, into the first position may couple the biasing mechanism 350 and the anchoring mechanism 320 (e.g., positioning the external booster 300 in the first configuration). Movement of the retention mechanism 400, or at least a portion or element thereof, into the second position may disconnect the biasing mechanism 350 from the anchoring mechanism 320 (e.g., positioning the external booster 300 in the second configuration). The first and second positions of the retention mechanism 400 may be axially spaced, circumferentially spaced, radially spaced, or any combination thereof.

Once released, the potential energy or preload of the biasing mechanism 350 may be restored during normal covering operation. For example, during retraction of the covering 22, reverse rotation of the rotatable member 50 may affect movement of the retention mechanism 400, which in turn may affect movement of the biasing mechanism 350 in a preloading direction. Once a desired preload is achieved, the retention mechanism 400 may move into the first position (e.g., positioning the external booster 300 in the first configuration) to maintain the preload in the biasing mechanism 350 for use during the next covering operating cycle. When in the first position, the retention mechanism 400 may be positioned so as to not interfere with covering operation. As arranged, an architecture-structure covering 10 is provided that includes a covering 22 that may be repeatedly lowered via gravity into a fully operational position in a continuous, uninterrupted, smooth action without operator intervention.

With continued reference to FIGS. 11-15, the architectural-structure covering 10 may include an external booster 300. The external booster 300 may be assembled as a single, modular unit that couples to one end of the head rail assembly 14 and rotatably couples with an end of the rotatable member 50. The external booster 300 (which may be referred to as a module, system, or unit) may be preassembled and thus simplify on-site installation of the architectural-structure covering 10. The external booster 300 may be incorporated into a new architectural-structure covering 10 or added to an existing or installed, architectural-structure covering 10 (i.e., retrofit applications).

With continued reference to FIGS. 11-13 and 15, the external booster 300 is shown in an assembled configuration. As illustrated, given the nature and space constraints of certain rotatable members 50 such as, for example, a dual roller unit including an inner roller positioned within an outer roller, as previously described herein, the external booster 300 is arranged and configured to be positioned exterior to the rotatable member 50. As such, as previously mentioned, the external booster 300 may include an anchoring mechanism 320. For example, in one embodiment, the external booster 300 includes a shaft 322 arranged and configured to couple to one of the end caps 26 of the head rail assembly 14 of the architectural-structure covering 10, although it is envisioned that the external booster 300 may be mounted to the architectural-structure covering 10 in other ways. For example, the shaft 322 may include an enlarged, first end portion 324 arranged and configured to attach to an end cap 26. For example, the enlarged, first end portion 324 may include axially extending splines or projections 325 configured to engage a corresponding recess, opening, or the like formed in the end cap 26. Alternatively, the shaft 322 may be coupled to the end caps 26 by any other now known or hereinafter developed mechanism such as, for example, a snap-fit connection, a press-fit connection, fasteners, etc. The external booster 300 may extend parallel with a central axis of the rotatable member 50. In use, in one embodiment, the shaft 322 is non-rotatably coupled to the end cap 26 of the head rail assembly 14. As such, the shaft 322 may be interchangeably referred to herein as a non-rotatable shaft 322. For example, the shaft 322 may be keyed to the end cap 26, although other mechanisms for preventing relative rotation between the shaft 322 and the end cap 26 may be utilized.

In addition, as illustrated, the external booster 300 is arranged and configured to couple to the rotatable member 50 such as, for example, the outer roller of a dual roller unit so that rotation from the external booster 300 is transferred to the outer roller, and vice versa. In use, the external booster 300 may be arranged and configured to rotatably couple to the rotatable member 50 (e.g., outer roller) by any suitable mechanism now known or hereafter developed. For example, as shown, the external booster 300 includes one or more gears 332 to couple the external booster 300 to the rotatable member 50. That is, for example, the rotatable member 50 may include a first gear 52 arranged and configured to rotate in unison with the rotatable member 50, and thus with the covering 22. The external booster 300 may also include a second gear 332 arranged and configured to rotate in unison with the external booster 300. One or more intermediate or idler gears 334 may be positioned between the first gear 52 of the rotatable member 50 and the second gear 332 of the external booster 300. Thus arranged, in use, rotation of the first gear 52 is transferred to the second gear 332 via the intermediate or idler gear 334, and vice-versa. Alternatively, in use, if reverse torque is necessary such as, for example, if the external booster 300 is mounted to the opposite, end cap 26 of the head rail assembly 14 of the architectural-structure covering 10, an additional, second idle gear may be provided.

In use, the external booster 300 may be configured to rotate the rotatable member 50 a specific amount (such as a final one-eighth revolution, one-quarter revolution, one-half revolution, three-quarters revolution, amounts therebetween, or other suitable amounts) as the covering 22 approaches a fully extended position. In one embodiment, the external booster 300 is configured to rotate approximately 330 degrees, as will be appreciated by one of ordinary skill in the art, the amount of rotation to the rotatable member 50 can be altered based on the gear ratios of gears 52, 332, 334.

Figure 14:
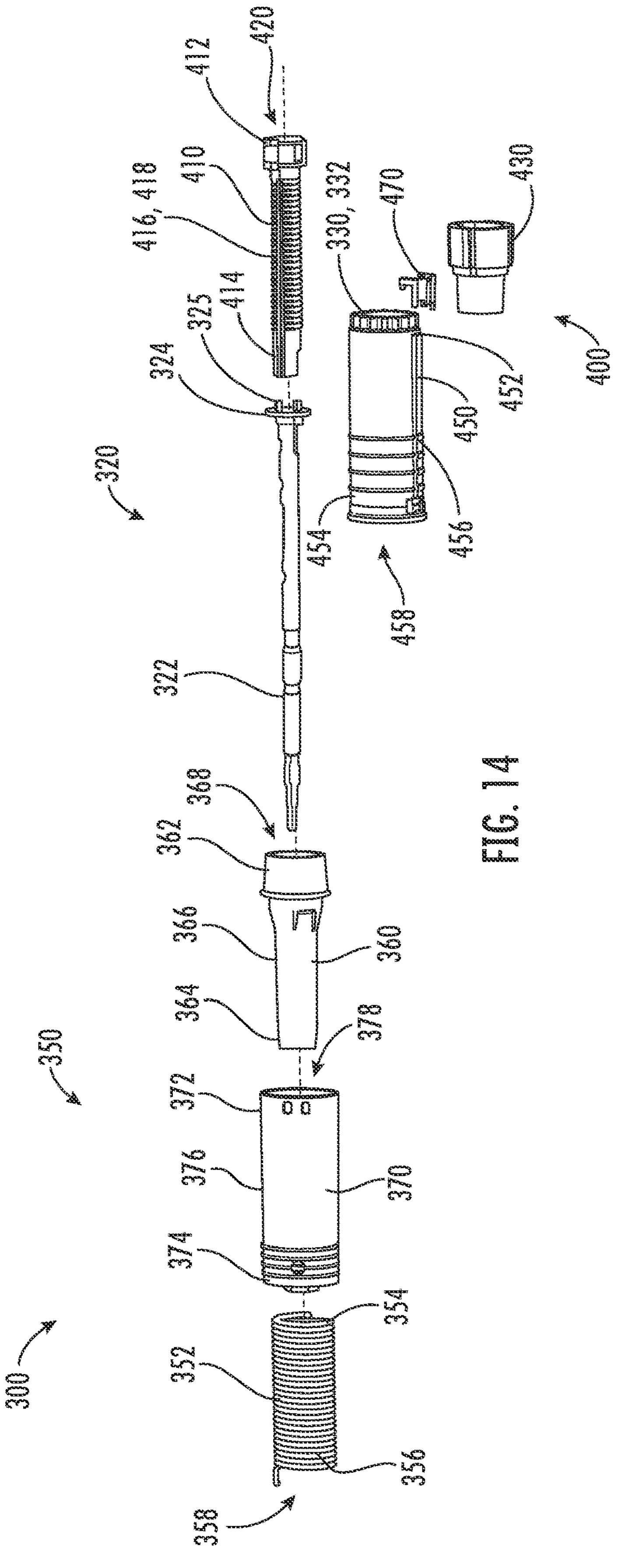
FIG. 14 is an exploded, perspective view of the external booster shown in FIG. 11.
Figure 15:
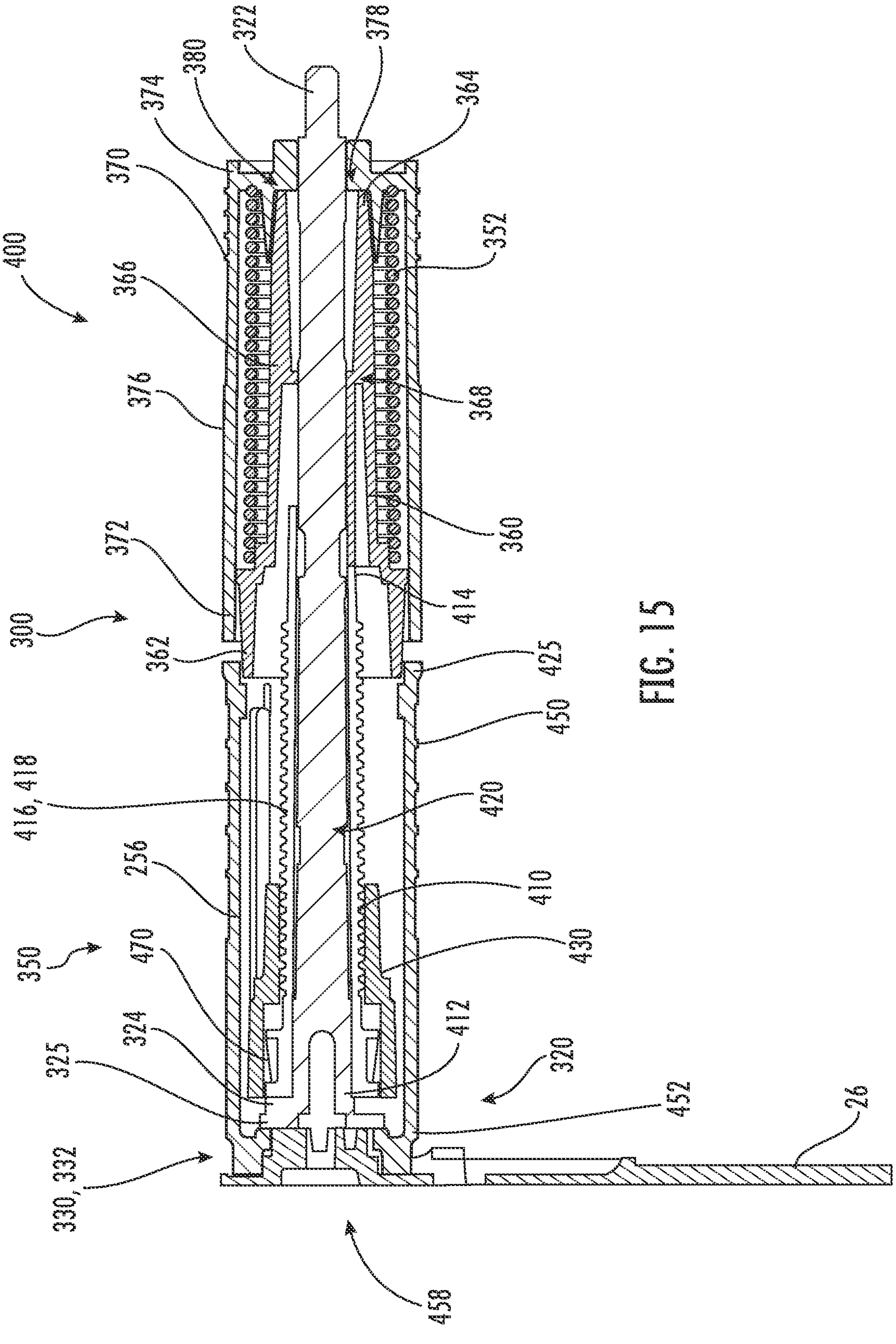
FIG. 15 is a cross-sectional view of the external booster shown in FIG. 11, the cross-sectional view taken along line XV-XV in FIG. 13.

Referring to FIGS. 14 and 15, in one embodiment, the biasing mechanism 350 of the external booster 300 may include a spring guide 360, a spring cap 370, and a biasing member (e.g., a spring) 352. As illustrated, the spring guide 360 includes a first end portion 362, a second end portion 364, and a central portion 366 positioned between the first and second end portions 362, 364. In addition, the spring guide 360 includes a bore 368 extending from the first end portion 362 to the second end portion 364, the bore 368 being sized and configured to enable the shaft 322 to pass therethrough. As illustrated, the first end portion 362 may be enlarged relative to the second end portion 364. In use, as will be described in greater detail below, the spring guide 360 is keyed to a bolt 410 of the retention mechanism 400 so that in use, rotation of the spring guide 360 rotates the bolt 410.

Referring to FIGS. 14 and 15, in one embodiment, the spring cap 370 includes a first end portion 372, a second end portion 374, and a central portion 376 positioned between the first and second end portions 372, 374. In addition, the spring cap 370 includes an interior cavity 378 for enclosing at least a portion of the spring guide 360 and the spring 352. In addition, as illustrated, the spring cap 370 includes a bore 380 sized and configured to enable the shaft 322 to pass therethrough. In use, the spring cap 370 is keyed to the shaft 322 so that in use, rotation of the spring cap 370 is inhibited.

With continued reference to FIGS. 14 and 15, in one embodiment, as previously mentioned, the biasing member 352 may be in the form of a spring such as, for example, a compression spring, an extension spring, a torsion spring, etc. Alternatively, it is envisioned that the biasing member may be in the form of any other suitable energy storage member. Thus, as used herein, biasing member and spring are used interchangeably without the intent to limit. As illustrated, the spring 352 includes a first end portion 354 and a second end portion 356. In addition, the spring 352 includes an interior cavity 358 arranged and configured to enable the spring guide 360 and the shaft 322 to pass therethrough. Thus, as illustrated, the spring 352 may be positioned about the central portion 366 of the spring guide 360. In use, the first end portion 354 of the spring 352 is coupled, contacts, etc. the first end portion 362 of the spring guide 360 such as, for example, a backside of the enlarged first end portion 362. Similarly, the second end portion 356 of the spring 352 may be coupled to the second end portion 374 of the spring cap 370. For example, a tang formed on the first end portion 354 of the spring 352 may be received within a channel formed in the spring guide 360. Similarly, a tang formed on the second end portion 356 of the spring 352 may be received within a channel formed in the spring cap 370, although any other suitable coupling structures may be used. In use, the second end portion 356 of the spring 352 is rotatably fixed to the spring cap 370.

Thus arranged, with the external booster 300 in the first configuration, the spring 352 may be preloaded to apply a force to the spring guide 360. However, because the spring guide 360 is inhibited from rotating (e.g., as will be described in greater detail herein, the spring guide 360 is keyed to a bolt 410 of the retention mechanism 400, which in the first configuration is coupled to the non-rotatable shaft 322), the spring 352 remains in the preloaded state. That is, in use, as will be described in greater detail herein, with the covering 22 in the retracted position (e.g., with the external booster 300 in the first configuration), the spring 352 is preloaded (e.g., the spring 352 is arranged and configured to apply a torque to the spring guide 360 however, because the spring guide 360 is prevented from rotating, the spring 352 remains preloaded).

Thereafter, when the external booster 300 is transitioned to the second configuration, the spring 352 applies a force (e.g., torque) to the spring guide 360, which is turn causes the retention mechanism 400 to rotate, which rotates the rotatable member 50 and the covering 22 (e.g., as will be described in greater detail below, when the external booster 300 is in the second configuration, the bolt 410 of the retention mechanism 400 is decoupled from the non-rotatable shaft 322 thereby enabling the spring guide 360 and the bolt 410 to rotate, which rotates a nut 430 and a drive sleeve 450 of the retention mechanism 400).

Referring to FIGS. 14 and 15, in one embodiment and as previously noted, the retention mechanism 400 of the external booster 300 may include a bolt 410, a traveling nut 430, and a drive sleeve 450. The retention mechanism 400 may also include a pawl 470. As illustrated, the bolt 410 includes a first end portion 412, a second end portion 414, and a central portion 416 positioned between the first and second end portions 412, 414. As illustrated, the bolt 410 also includes an externally threaded section 418 (e.g., external threads extend across a majority of the length of the central portion 416, as such the bolt 410 may also be referred to as an externally threaded bolt). In use, as will be described in greater detail below, the external threads formed on the bolt 410 are arranged and configured to threadably engage the traveling nut 430. In addition, the bolt 410 includes a bore 420 extending from the first end portion 412 to the second end portion 414, the bore 420 being sized and configured to enable the shaft 322 to pass therethrough. As illustrated, the first end portion 412 may be enlarged relative to the second end portion 414. In use, as will be described in greater detail below, with the external booster 300 in the first configuration, the bolt 410 is inhibited from rotating, however when the external booster 300 is transitioned from the first configuration to the second configuration, the bolt 410 is permitted to rotate.

With continued reference to FIGS. 14 and 15, the drive sleeve 450 is rotatably coupled to the rotatable member 50 of the architectural-structure covering 10 via, for example, one or more gears 52, 332, 334. As such, in use, rotation of the drive sleeve 450 rotates the rotatable member 50, and vice-versa. As illustrated, in one embodiment, the drive sleeve 450 includes a first end portion 452, a second end portion 454, and a central portion 456 positioned between the first and second end portions 452, 454. The first end portion 452 can include the gear 332. In addition, the drive sleeve 450 can include an interior cavity 458 for enclosing at least a portion of the shaft 322, the bolt 410, and the traveling nut 430.

The traveling nut 430 may be threadably engaged to the bolt 410. For example, the traveling nut 430 may be threadably mounted onto the threaded section 418 of the bolt 410. In use, rotation of the traveling nut 430 relative to the bolt 410 causes the traveling nut 430 to axially translate along a longitudinal length of the bolt 410. In addition, the traveling nut 430 is keyed to the drive sleeve 450 so that the nut 430 and the drive sleeve 450 rotate in unison. Thus arranged, during retraction of the covering 22, rotation of the rotatable member 50 rotates the drive sleeve 450, which causes the nut 430 to axially translate toward the second end portion 414 of the bolt 410 (e.g., to the right in FIG. 15). During extension of the covering 22, the traveling nut 430 axially translates towards the first end portion 412 of the bolt 410 (e.g., to the left in FIG. 15). As will be appreciated by one of ordinary skill in the art, these movements could be reversed.

As will be described in greater detail below, movement of the covering 22 from the retracted position to the extended position causes the traveling nut 430 to axially translate toward the first end portion 412 of the bolt 410 causing the traveling nut 430 to contact the pawl 470, which causes the pawl 470 to move from a first or engaged position to a second or disengaged position.

In the first position, the pawl 470 is in engagement with the non-rotatable shaft 322 and as a result, rotation of the bolt 410 relative to the non-rotatable shaft 322 is prevented. In the second position, the pawl 470 is decoupled from the non-rotatable shaft 322. As such, rotation of the bolt 410 relative to the non-rotatable shaft 322 is enabled. Movement of the pawl 470 from the first position to the second position causes the external booster 300 to transition from the first configuration to the second configuration. Thus, movement of the covering 22 from the retracted position to the extended position causes the traveling nut 430 to contact the pawl 470, which causes the pawl 470 to release the non-rotatable shaft 322, thus enabling the bolt 410 to rotate due to the preloaded torque built up in the spring 352. As such, with the pawl 470 in the second position, released from the non-rotatable shaft 322, the spring 352 biases and rotates the spring guide 360 causing the spring guide 360 and the bolt 410 to rotate, which in turn rotates the nut 430 and the drive sleeve 450. Rotation of the drive sleeve 450 rotates the rotatable member 50, and hence the covering 22, of the architectural-structure covering 10 to further rotate the covering 22 to the fully deployed position.

Similarly, movement of the covering 22 from the fully deployed position to the retracted position, causes the traveling nut 430 to axially translate towards the second end portion 414 of the bolt 410 and away from the first end portion 412 of the bolt 410 causing the traveling nut 430 to rotate in the opposite direction, which causes the pawl 470 to move from the second position to the first position. As such, movement of the covering 22 from the fully deployed position to the retracted position causes the pawl 470 to reengage the non-rotatable shaft 322 thus preventing the bolt 410, and hence the spring guide 360 from rotating. Thus arranged, the external booster 300 can be transitioned from the second configuration to the first configuration. In addition, initial movement of the covering 22 from the fully deployed position to the retracted position causes the bolt 410 and the spring guide 360 to rotate in the opposite direction thereby compressing the spring 352, preloading the spring 352 for the next operating cycle (e.g., initial rotation of the pawl 470 and the nut 430 before the pawl 470 reengages the non-rotatable shaft 322 compresses and preloads the springs 352). As such, with the pawl 470 in the first position, coupled to the non-rotatable shaft 322, the spring 352 is once again preloaded.

Referring to FIGS. 16A-16H, an example embodiment of a locking mechanism for coupling and disconnecting the bolt 410 and the non-rotatable shaft 322 is illustrated. As previously mentioned, in the first configuration of the external booster 300, the spring 352 is preloaded. Since the bolt 410 is rotationally coupled to the non-rotatable shaft 322, however, the bolt 410 is prevented from rotating, which prevents the spring guide 360 from moving. In the second configuration of the external booster 300, the bolt 410 is decoupled from the shaft 322 so that the bolt 410 can rotate relative to the non-rotatable shaft 322. Thus arranged, in the second configuration of the external booster 300, the spring 352 biases the spring guide 360, which rotates the bolt 410, the traveling nut 430, and the drive sleeve 450 to rotate, which in turn rotates the rotatable member 50 and the covering 22.

In use, the locking mechanism may be any suitable mechanism for rotationally engaging and disengaging the bolt 410 from the shaft 322. For example, as illustrated and as previously mentioned, the locking mechanism may be a pawl 470. In use, the pawl 470 may be movable such as, for example, pivotable from a first or engaged position to a second or disengaged position. With reference to FIGS. 16A-16H, various views illustrating movement of the pawl 470 from the first or engaged position to the second or disengaged position are shown. As illustrated, the pawl 470 may include a head portion 480. In the first position, the head portion 480 of the pawl 470 may be received within a pocket 500 formed in the non-rotatable shaft 322. In this position, the pawl 470 is rotationally coupled to the non-rotatable shaft 322 so that relative rotation between the bolt 410 and the non-rotatable shaft 322 is prevented.

Figure 16A:
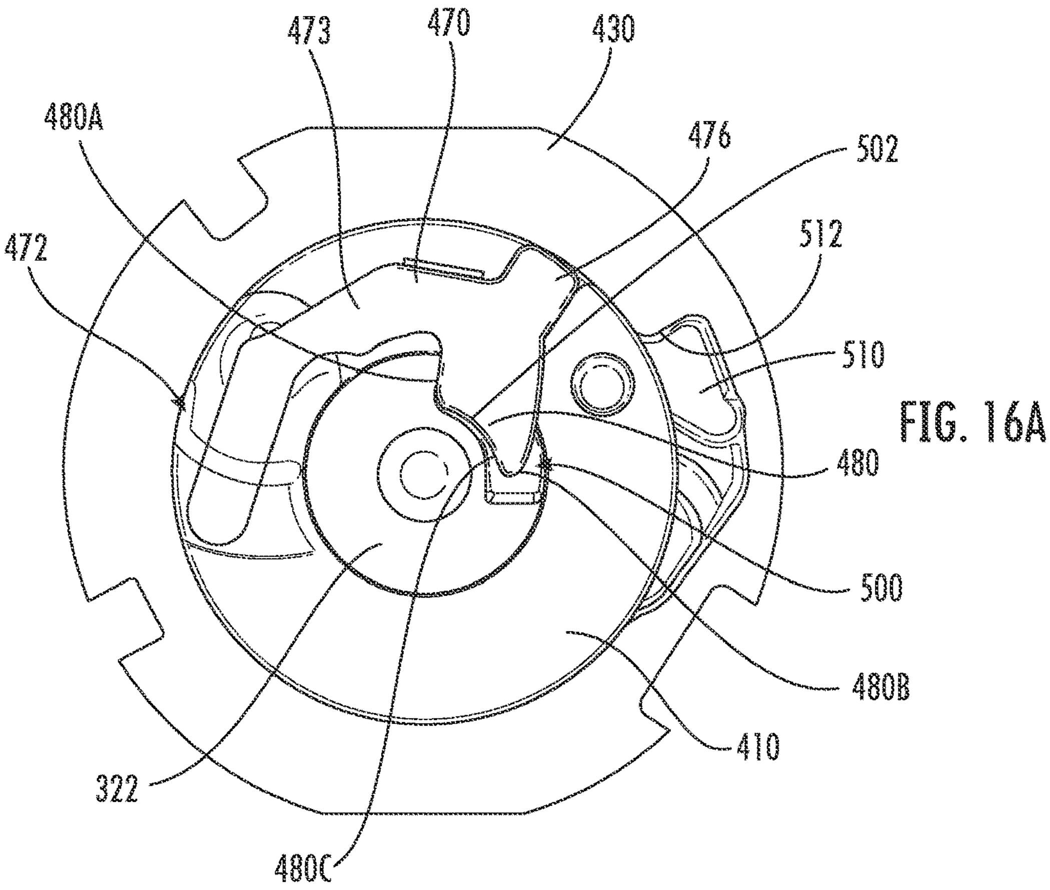
FIGS. 16A-16H are various view illustrating movement of a pawl between a first position and a second position, FIG. 16A illustrating the pawl in the first position, FIG. 16E illustrating the pawl in the second position.
Figure 16B:
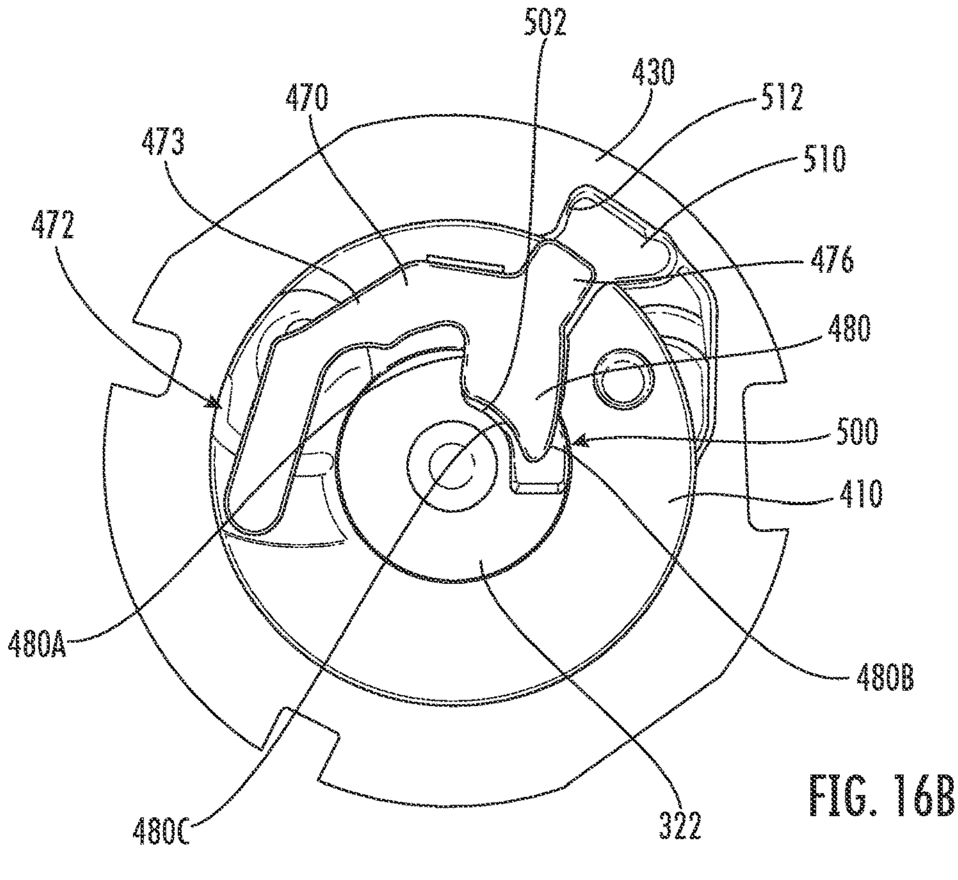
Figure 16C:
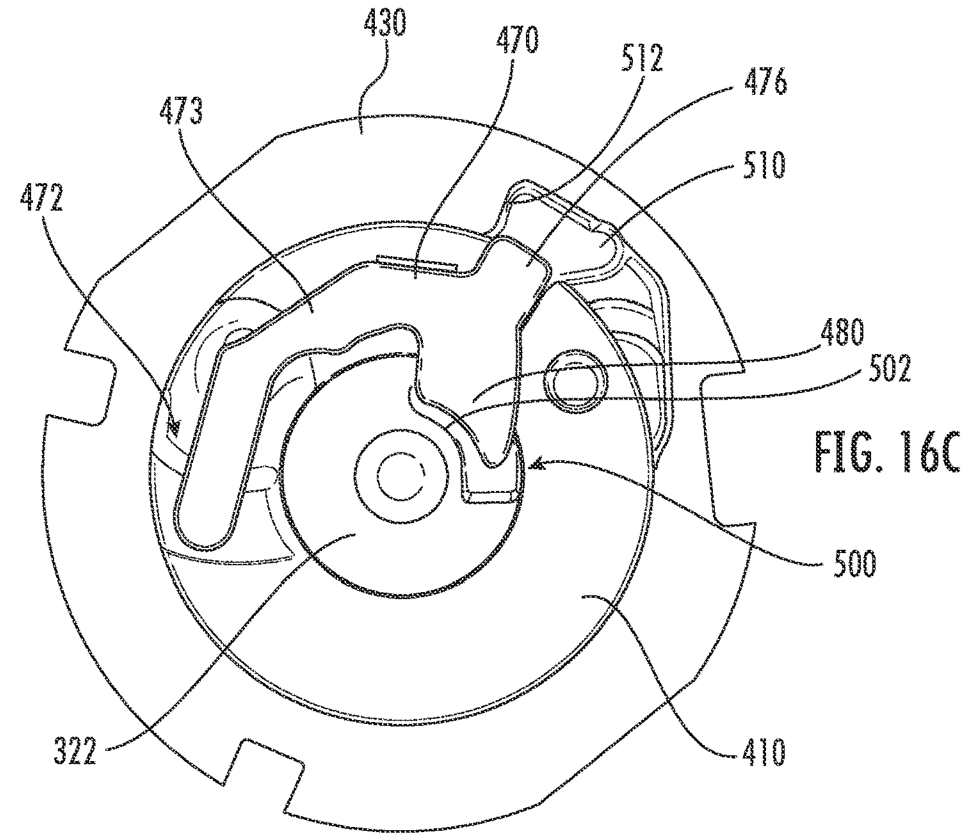
Figure 16D:
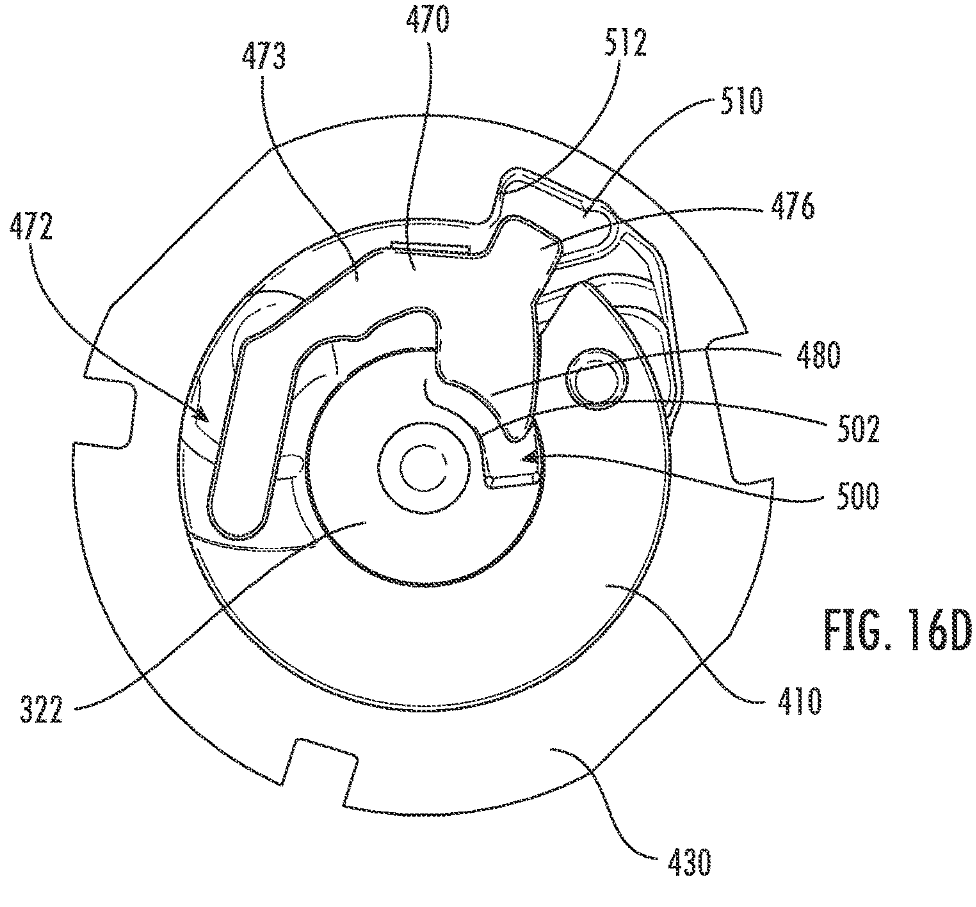
Figure 16E:
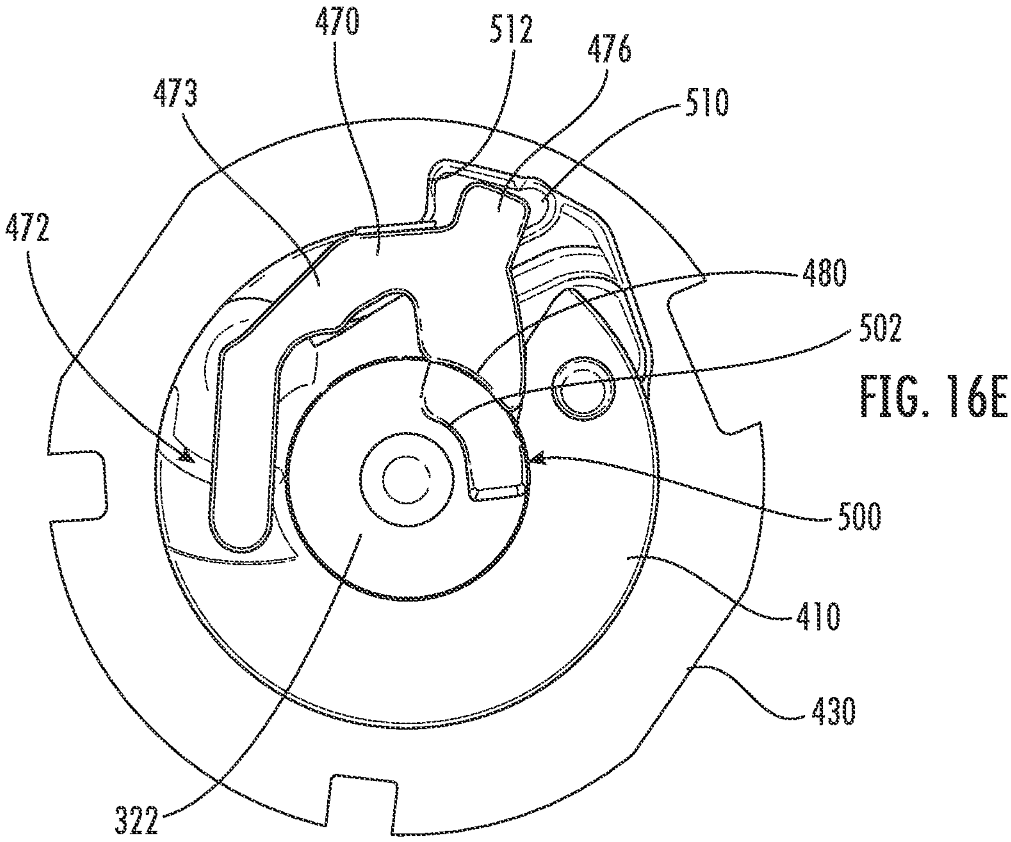
Figure 16F:
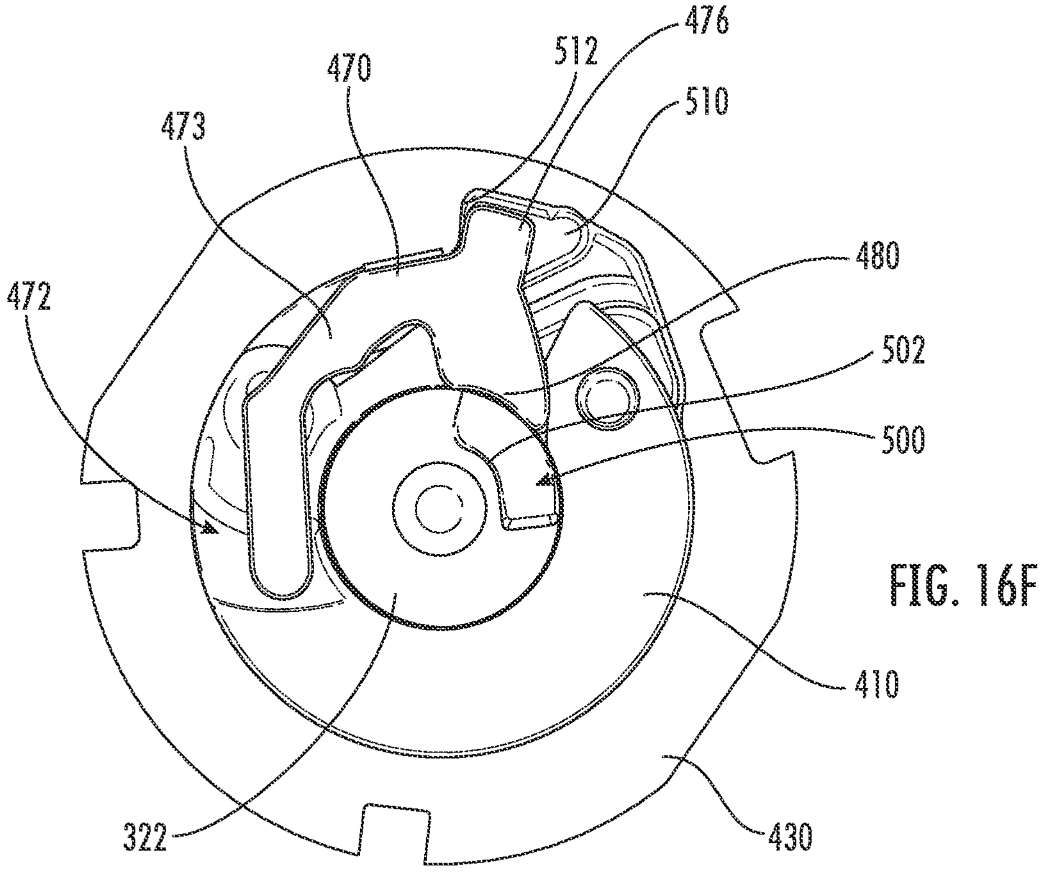
Figure 16G:
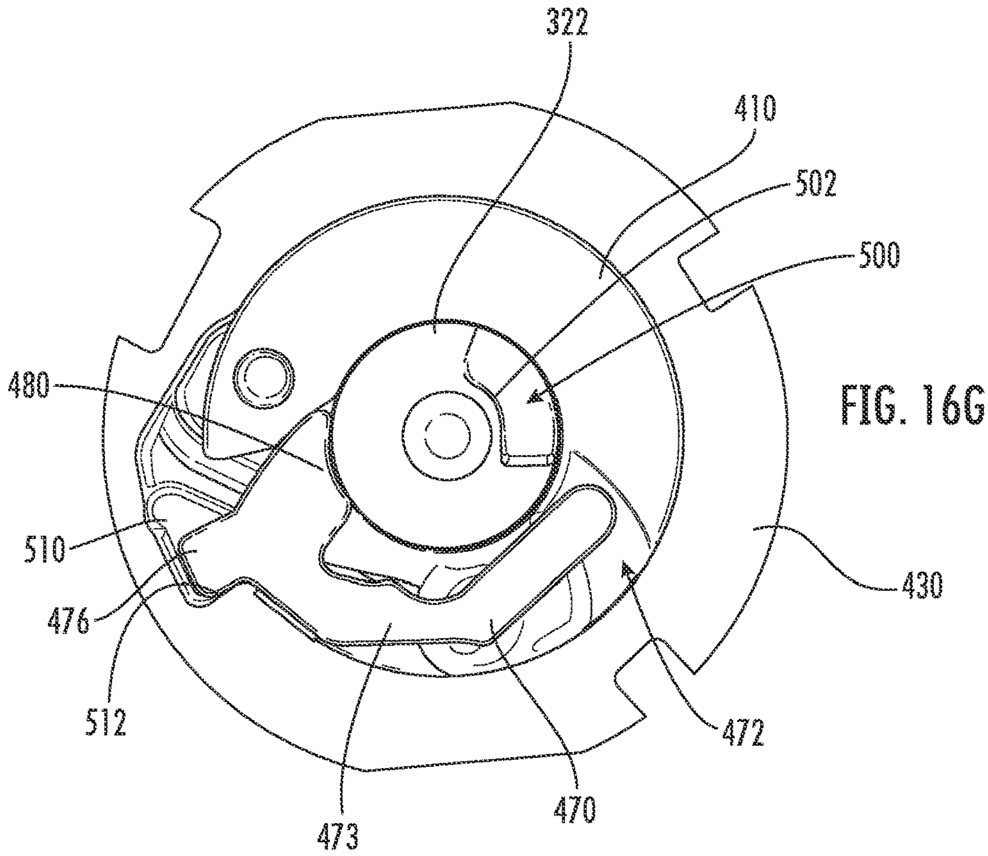
Figure 16H:
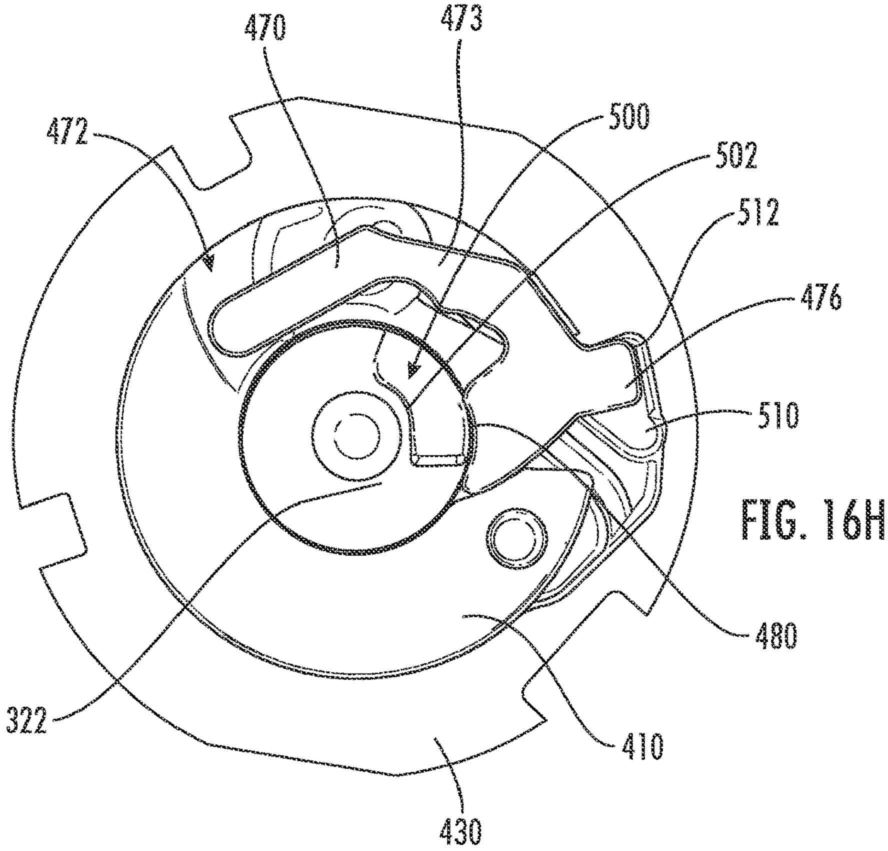
Figure 16I:
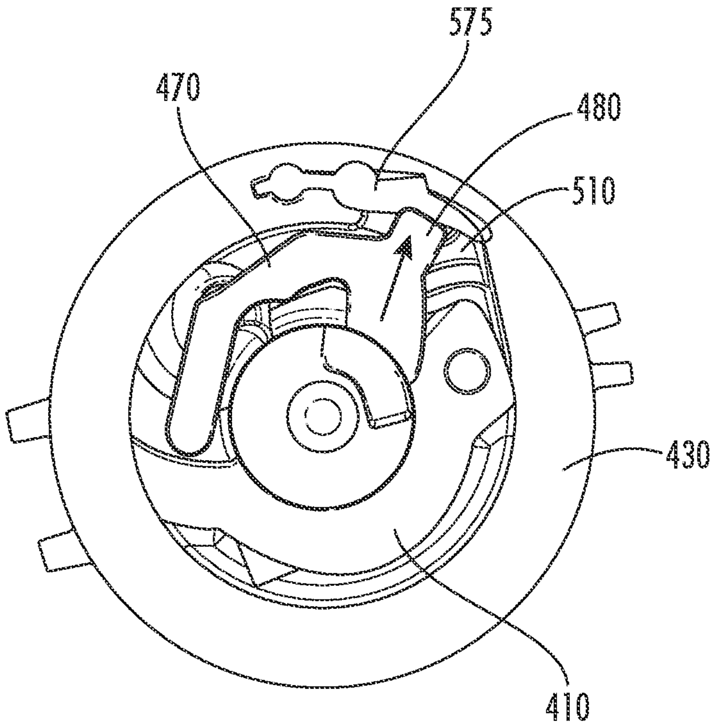
FIG. 16I is a view of an alternate example embodiment of the pawl illustrated in the second position, the system including an optional bumper.

Referring to FIG. 16I, in one embodiment, the nut 530 may include a bumper 575 located in the pocket 510 thereof. In use, as the pawl 470 moves outwards, and the spring charge is released, the pawl 470 contacts the bumper 575 causing the bumper 575 to compress, absorbing some of the impact or shock. In use, the bumper 575 may be manufactured from any suitable material such as, for example, a softer durometer material. Thus arranged, in use, the bumper 575 is arranged and configured to reduce noise when the booster fires.

Figure 17A:
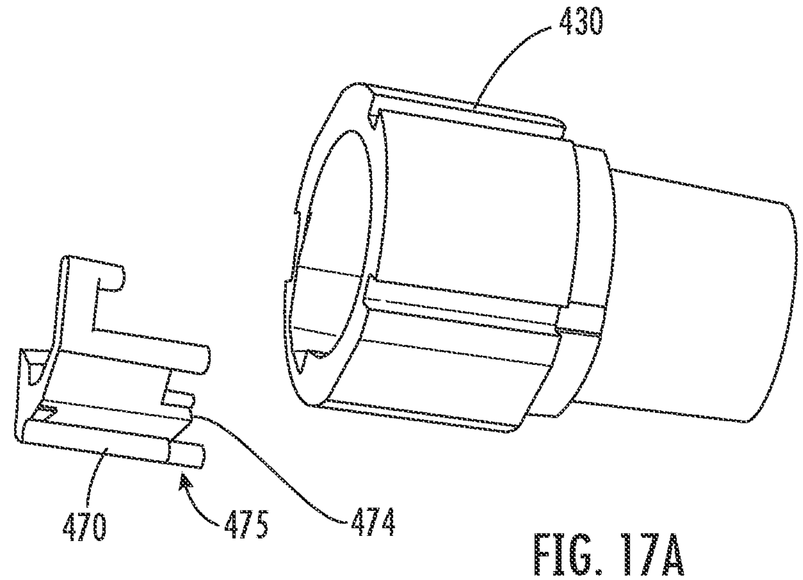
FIG. 17A is an exploded, perspective view of an example of an embodiment of a pawl and a nut in accordance with one or more aspects of the present disclosure.
Figure 17B:
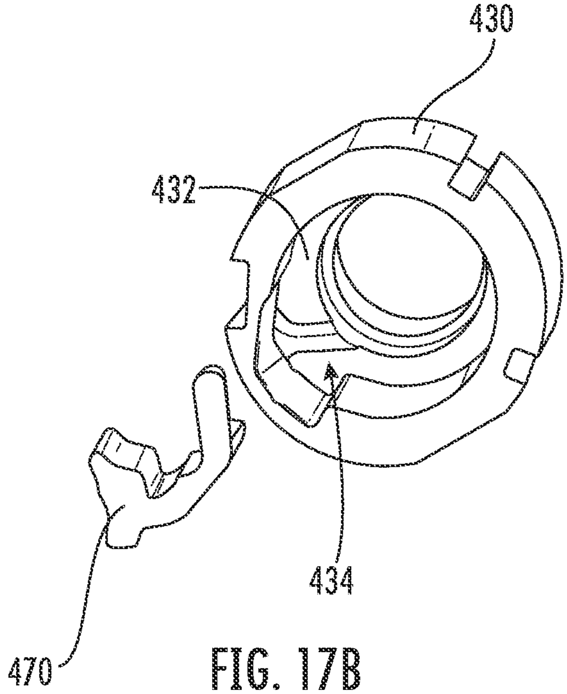
FIG. 17B is a side, exploded, perspective view of the pawl and nut shown in FIG. 17A.

Referring to FIGS. 17A and 17B, as illustrated, the pawl 470 may include a projection, a pin, etc. 475 extending from a rear surface 474 of the pawl 470. In use, the traveling nut 430 includes a contacting surface 432 having a pathway, a groove, a recess, or the like 434 formed therein (terms used interchangeably herein without the intent to limit). As the contacting surface 432 of the traveling nut 430 contacts the rear surface 474 of the pawl 470, the pathway 434 interacts with the pin 475 extending from the rear surface 474 of the pawl 470. This interaction between the pin 475 and the pathway 434 guides movement of the pawl 470 as the traveling nut 430 continues to rotate so that the head portion 480 of the pawl 470 moves out of the pocket 500 formed in the shaft 322, as illustrated in, for example, FIG. 16E (e.g., the pin 475 is arranged and configured to ride along the pathway 434 formed in the contacting surface 432 of the traveling nut 430). Once the pawl 470 is moves out of the pocket 500, the bolt 410 and the non-rotatable shaft 322 are rotatably decoupled. As such, the preload force in the spring 352 is released, which causes the spring guide 360, the bolt 410, the traveling nut 430, and the drive sleeve 450 to rotate, which causes the rotatable member 50 to rotate via the interconnecting gears such as, for example, gears 52, 332, 334, or flexible gears 600 as will be described in greater detail below. As will be appreciated, this results in additional rotation being transmitted to the covering 22 to ensure that the covering 22 is in the fully deployed position. That is, in operation, as the covering 22 approaches a predetermined extended position, the traveling nut 430 axially translates along the threaded section 418 of the bolt 410 toward the pawl 470. The external booster 300 is mechanically toleranced and timed so that as the covering 22 reaches a predetermined covering position, the pathway 434 contacts the pin 475 and pivots the pawl 470 from the first or engaged position to the second or disengaged position, thereby disengaging the pawl 470 from the pocket 500 formed in the non-rotatable shaft 322. In one embodiment, the predetermined covering position (e.g., limit stop) can be changed for different products (e.g., different limit stops can be provided or adjusted) by adjusting the rotatable member 50 to the desired limit stop position prior to attaching the external booster 300 to the end cap 26.

In use, and as best illustrated in FIG. 16H, the traveling nut 430 and pawl 470 are arranged and configured to rotate until reaching a limit stop, which prevents the pawl 470 from reengaging the pocket 500 when rotating in the extension direction. As previously mentioned, and as illustrated in FIGS. 16A-16H, once released, the traveling nut 430 and the pawl 470 are arranged and configured to rotate approximately 330 degrees, although other ranges of rotation are envisioned.

Subsequent rotation of the covering 22 from the fully deployed position to the retracted position causes the rotatable member 50 and hence the drive sleeve 450 and the traveling nut 430 to rotate in the opposite direction (e.g., clockwise direction as viewed in FIGS. 16A-16H). When rotated in the clockwise direction, an abutment surface 512 of an opposing pocket 510 formed in the contacting surface 432 of the traveling nut 430 contacts a segment, a leg, a projection, or the like 476 (terms used interchangeably herein without the intent to limit) formed on the pawl 470 thereby rotating the pawl 470 in the clockwise direction until the head portion 480 of the pawl 470 is aligned with the pocket 500 formed in the non-rotatable shaft 322. Thereafter, via continued rotation of the traveling nut 430 and the interacting arcuate or curved surfaces between the pawl 470 and the non-rotatable shaft 322, the head portion 480 of the pawl 470 is received once again within the pocket 500 formed in the non-rotatable shaft 322. Thus arranged, the bolt 410 is once again rotationally coupled to the non-rotatable shaft 322. In addition, rotation of the traveling nut 430 and the pawl 470 in the clockwise direction causes the bolt 410, the spring guide 360, and the spring 352 to rotate, which preloads the spring 352 once again.

More specifically, with continued reference to FIGS. 16A-16H, the pawl 470 may be pivotably seated in the pocket 500 formed in the non-rotatable shaft 322. The pawl 470 may include a seat portion 472 for pivotably coupling the pawl 470 relative to the traveling nut 430, the head portion 480, and intermediate portion 473 located therebetween. As illustrated, the head portion 480 may have an arcuate or curved outer surface corresponding to the shape of the pocket 500. The seat portion 472 may serve as the pivot axis of the pawl 470, which may be substantially parallel to a longitudinal axis or centerline of the rotatable member 50 and/or the external booster 300. As such, the head portion 480 may be movable between a radially-inward position (e.g., the first or engaged position) and a radially-outward position (e.g., the second or disengaged position). The head portion 480 of the pawl 470 may be arranged and configured to be received within the pocket 500 formed in the non-rotatable shaft 322 to restrain rotation of the bolt 410. As illustrated, in one embodiment, the head portion 480 may include a proximal face 480*a*, a distal face 480*b*, and an intermediate face 480*c* extending between the proximal and distal faces 480*a*, 480*b*. The proximal and distal faces 480*a*, 480*b* may be arcuate or curved. The intermediate face 480*c* may be arcuate or curved and have a radius. In use, the leg 476 is positioned on a same side of the head portion 480 as the proximal face 480*a* of the head portion 480 and opposite that of the distal face 480*b* of the head portion 480.

As described herein, the external booster 300 is arranged and configured to provide supplemental rotation of the rotatable member 50, and hence the covering 22. For example, the external booster 300 may be arranged and configured to provide supplemental rotation to ensure that the covering 22 is moved to an open configuration. Alternatively, the external booster 300 may be arranged and configured to over-rotate the front sheet 30 relative to the rear sheet 34.

That is, according to one or more aspects of the present disclosure, with the external booster 300 in the first configuration, the pawl 470 is in the first or engaged position (e.g., the head portion 480 of the pawl 470 is positioned within the pocket 500 formed in the non-rotatable shaft 322). In one embodiment, the head portion 480 of the pawl 470 may extend into the pocket 500 of the non-rotatable shaft 322 and the intermediate face 480*c* may abut or contact an arcuate or curved base wall 502 of the pocket 500. Thus arranged, the pawl 470 may be rotationally constrained to the non-rotatable shaft 322, thereby rotationally constraining the bolt 410. In other words, the external booster 300 may be rotationally constrained in a static, preloaded configuration during a majority of the covering 22 movement. In this configuration, the external booster 300 may not interfere with the operation of the covering 22.

During rotation of the rotatable member 50, and hence the covering 22, in the extension direction, with the external booster 300 in the first configuration (e.g., with the spring 352 preloaded and the bolt 410 coupled to the non-rotatable shaft 322), the traveling nut 430 rotates in unison with the rotatable member 50 and axially translates along the length of the bolt 410 toward the pawl 470. As the covering 22 approaches the predetermined extended position (for example, as the covering 22 approaches the extended or deployed position depicted FIG. 1), the contacting surface 432 of the nut 430 approaches the rear surface 474 of the pawl 470. As the rotatable member 50, and thus the nut 430, continue to rotate in the extension direction under the influence of gravity, the pin 475 extending from the rear surface 474 of the pawl 470 approaches and interacts with the pathway 434 formed in the contacting surface 432 of the nut 430. Continued rotation of the rotatable member 50, causes the pawl 470 to become disengaged or lifted from the pocket 500 formed in the non-rotatable shaft 322 via the interaction between the pin 475 and pathway 434 thus permitting rotation of the spring guide 360, the bolt 410, the nut 430, and the drive sleeve 450 under the influence of the spring 352. This additional rotation via the spring 352 enables the covering 22 to extend to the fully deployed position such as, for example, depicted in FIG. 2.

Figure 2:
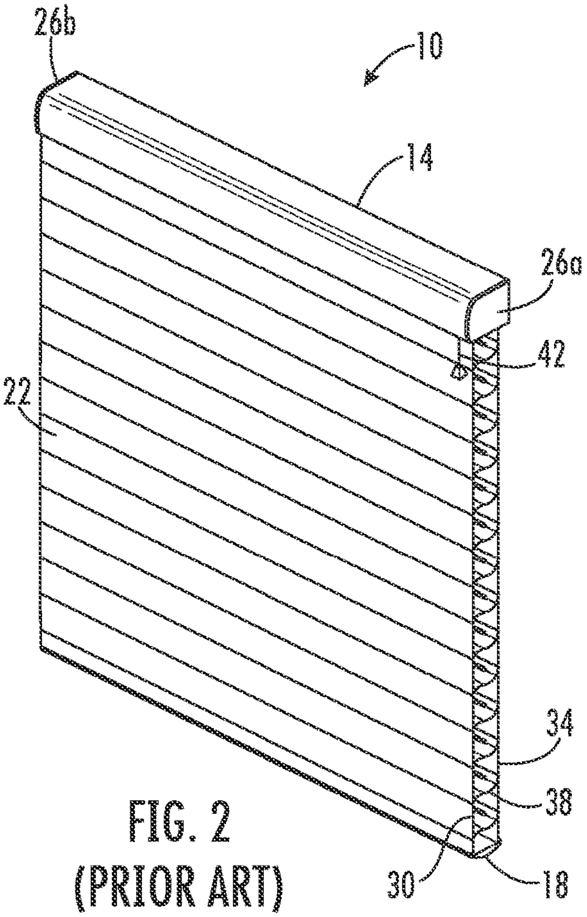
FIG. 2 (PRIOR ART)
FIG. 2 is an alternate, perspective view of the architectural-structure covering of FIG. 1, the first covering shown in a fully extended or deployed position, the first covering shown in an open configuration.
Figure 3:
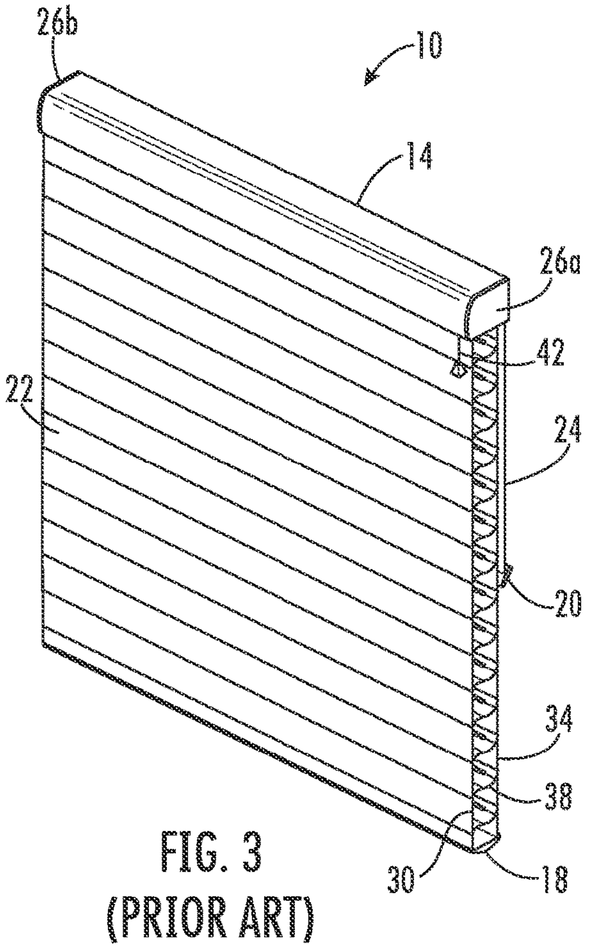
FIG. 3 (PRIOR ART)
FIG. 3 is an alternate, perspective view of the architectural-structure covering of FIG. 1, the second covering shown in a partially extended position.
Figure 4:
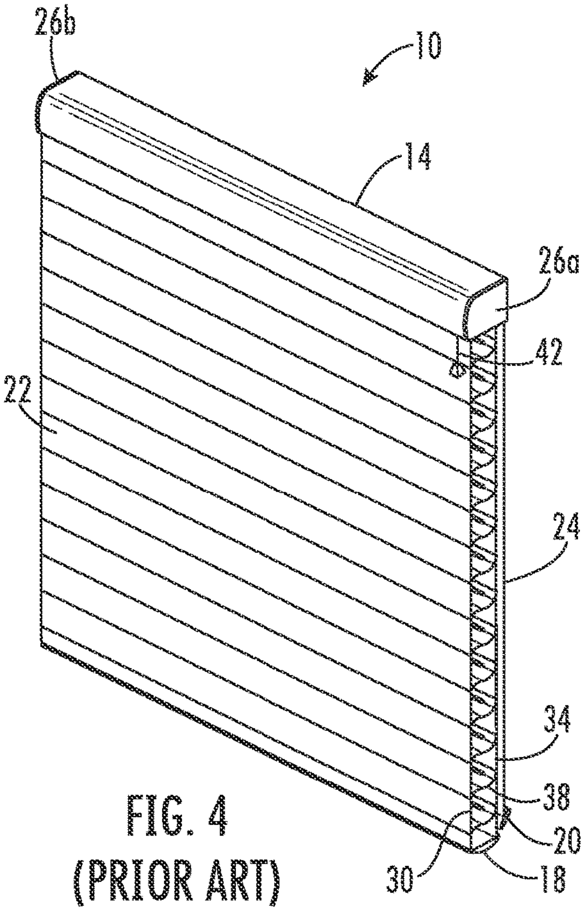
FIG. 4 (PRIOR ART)
FIG. 4 is an alternate, perspective view of the architectural-structure covering of FIG. 1, the second covering shown in a fully extended or deployed position.
Figure 5:
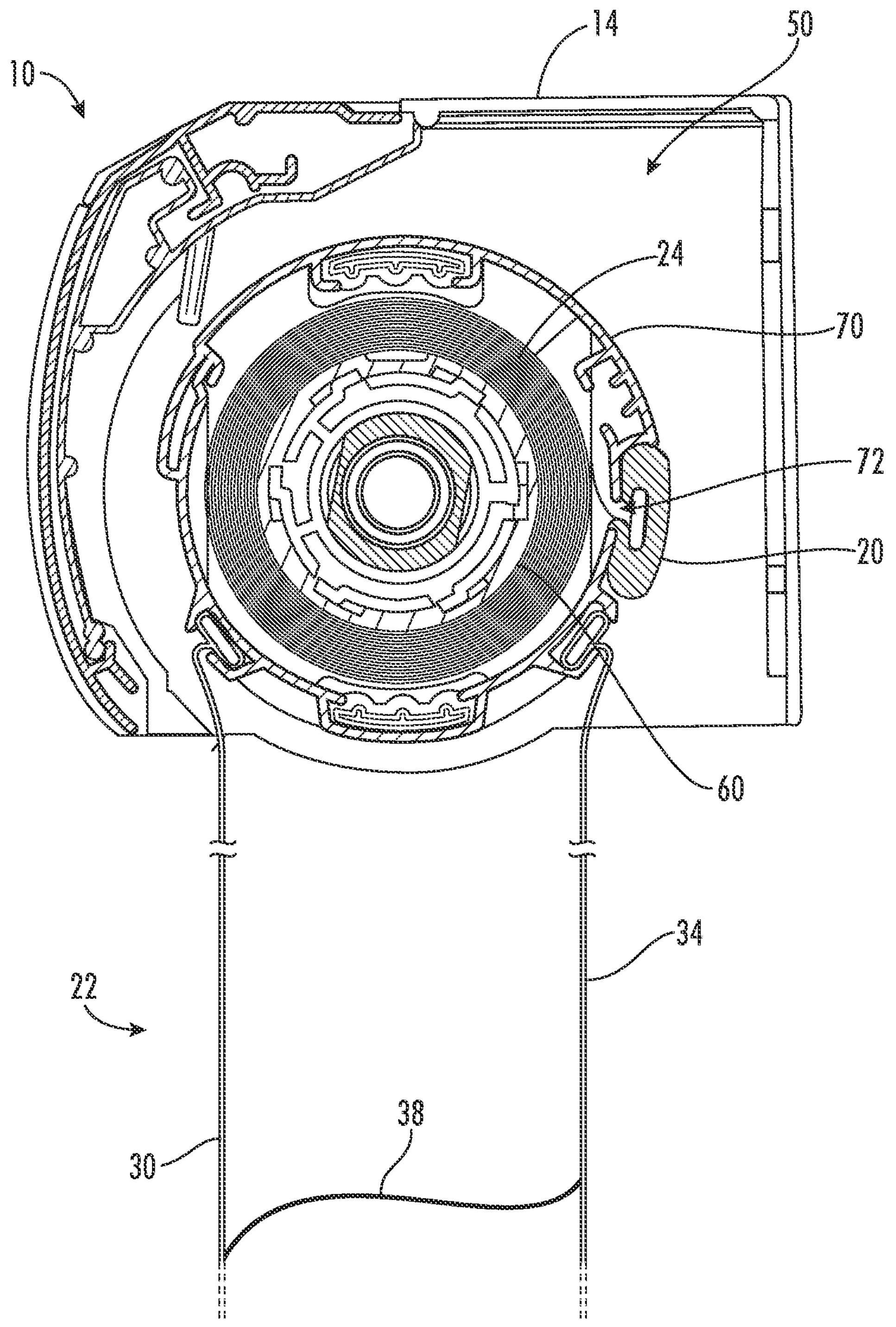
FIG. 5 (PRIOR ART)
FIG. 5 is a cross-sectional view illustrating a known example of an embodiment of a dual roller unit that may be used in combination with the architectural-structure covering of FIG. 1, the dual roller unit including an inner roller coupled to the second covering and an outer roller coupled to the first covering.

After the pawl 470 is rotationally disengaged from the non-rotatable shaft 322, the pawl 470 contacts or engages the abutment surface 512 of the traveling nut 430. The initial contact or engagement between the pawl 470 and the nut 430 may occur as the rotatable member 50 begins a final or nearly final revolution in the extension direction. Once in contact or engagement, the pawl 470 may rotate the rotatable member 50 in the extension direction to fully extend the covering 22 (FIG. 2). That is, with the pawl 470 disengaged from the non-rotatable shaft 322, the spring 352 applies a rotation force to cause the spring guide 360, the bolt 410, the traveling nut 430, and the drive sleeve 450 to rotate, which in turns causes the rotatable member 50, and hence the covering 22, to rotate in the extension direction.

Generally speaking, in use, the external booster 300 may be configured to supplementally rotate the rotatable member 50 any desired rotational amount after the covering 22 reaches a desired extended position, such as a final revolution of the rotatable member 50 associated with a fully extended covering position. That is, as described herein, the external booster 300 may drive or rotate the rotatable member 50 in the extension direction toward an open configuration in which the front and rear sheets 30, 34 are laterally spaced from one another and the vanes 38 are substantially horizontal (FIG. 2). In this fully deployed position, a limit stop may inhibit further rotation of the rotatable member 50 under the bias of the spring 352. As such, in one implementation, the external booster 300 may supplementally rotate the rotatable member 50 once the covering 22 has reached a fully extended, closed position to reconfigure the covering 22 from an extended and closed-vane position (see FIG. 1, for example) to an extended and open-vane position (see FIG. 2, for example).

After rotating the rotatable member 50, the pawl 470 may be reset into the first or engaged position during normal operation of the architectural-structure covering 10. For example, during rotation of the rotatable member 50 in the retraction direction, the nut 430 and the pawl 470 may rotate in the opposite direction (e.g., in the clockwise direction as illustrated in FIGS. 16A-16H). In addition, the external booster 300, or at least portions thereof such as, for example, the bolt 410 and the spring guide 360 may rotate in the retraction direction against the bias of the spring 352, thereby preloading the spring 352. Once the head portion 480 of the pawl 470 is rotatably aligned with the pocket 500, the interaction between the corresponding arcuate surfaces causes the pawl 470 to pivot back to its first or engaged position with the head portion 480 located within the pocket 500 of the non-rotatable shaft 322. In this position, the pawl 470 prevents rotation of the bolt 410, thereby maintaining the preload in the spring 352 for the next lowering cycle. Upon the pawl 470 moving into the first or engaged position in the pocket 500, the pawl 470 may not interfere with rotation of the rotatable member 50 and thus further retraction of the covering 22 may occur nominally. As provided herein, the external booster 300 is transitioned back to its first configuration under normal retraction of the covering 22.

In accordance with another separate and distinct aspect of the present disclosure that may be used separately from, or in combination with, the other aspects of an architectural-structure covering disclosed herein, the one or more gears such as, for example, gear 52, 332, 334 may be in the form of a flexible, compressible, or spring-loaded gear (terms used interchangeably herein without the intent to limit). In use, the one or more flexible gears are arranged and configured to enable compression between adjoining gears to provide, for example, a friction fit type meshing with corresponding gears to ensure constant contact between the gears during operation to prevent, or at least reduce, unwanted backlash and/or unwanted clearance.

Figure 20A:
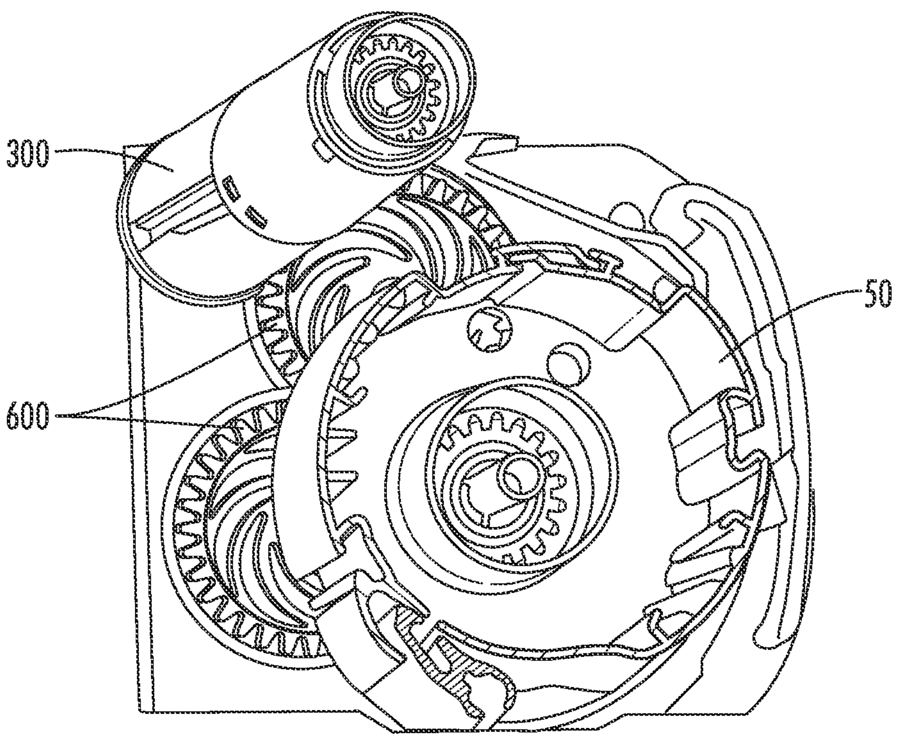
FIGS. 20A and 20B illustrate an example embodiment of first and second flexible gears as shown in FIG. 18, the first and second flexible gears coupling an external booster to a rotatable member in accordance with one or more features of the present disclosure.
Figure 20B:
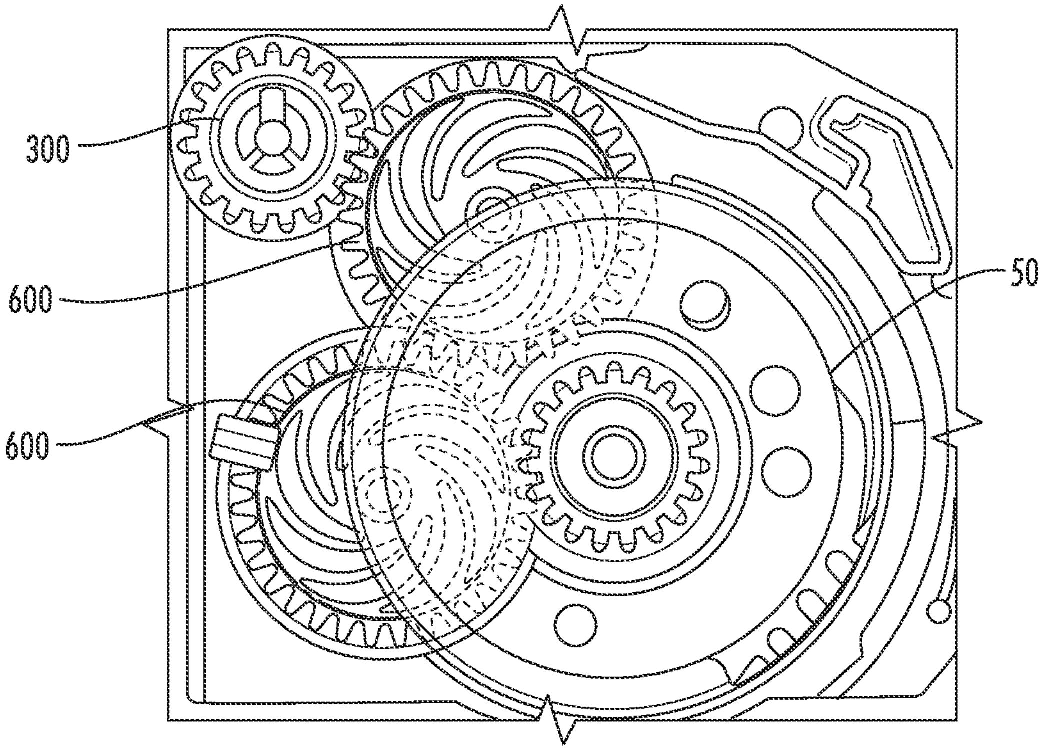
Figure 20C:
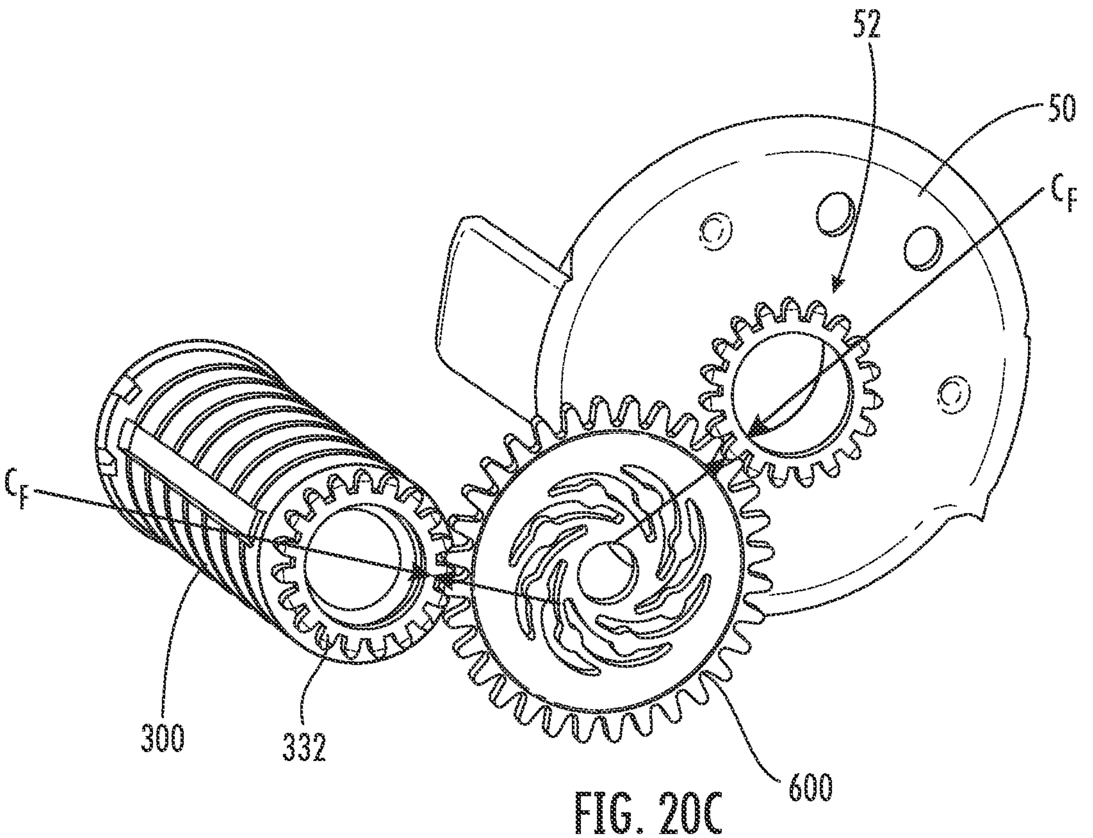
FIG. 20C illustrates an alternate example embodiment of a flexible gear as shown in FIG. 18, the flexible gear coupling an external booster to a rotatable member in accordance with one or more features of the present disclosure.

It should be appreciated that while the flexible gears may be described and illustrated herein in connection with an architectural-structure covering and more particularly for use with coupling the external booster 300 to the rotatable member 50 (as illustrated in FIGS. 20A-20C), the flexible gears should not be so limited. That is, the flexible gears may have application outside of architectural-structure coverings and may be used in place of traditional gears. As such, the flexible gears should not be limited for use in architectural-structure coverings unless explicitly claimed.

Figure 18:
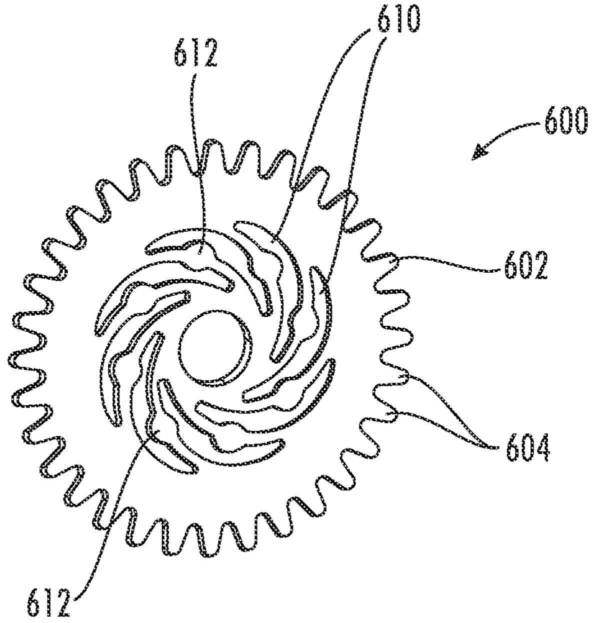
FIG. 18 is a perspective view of an example embodiment of a flexible gear in accordance with one or more features of the present disclosure.

Referring to FIG. 18, an example embodiment of a flexible gear 600 is illustrated. As illustrated, in one embodiment, the flexible gear 600 may include an outer circumference 602 having a plurality of teeth 604 for meshing with mating gears as conventionally known. However, in accordance with features of the present disclosure, the flexible gear 600 may also include a plurality of spiral cutouts 610 formed adjacent to the plurality of teeth 604 (e.g., spiral cutouts 610 are positioned between the outer circumference 602 and teeth 604 and center bore or axis of the gear 600). In use, the spiral cutouts 610 enable the flexible gear 600 to compress or flex inwardly by a predetermined amount when a radial force is applied to the flexible gear 600.

Figure 19A:
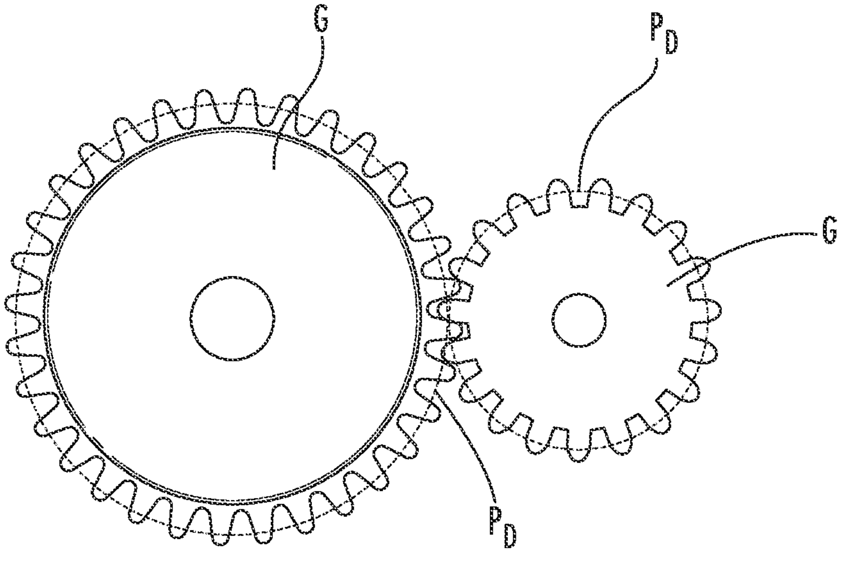
FIG. 19A illustrates a conventional gear shown in a nominal position where the gear teeth and/or pitch diameters of adjacent gears perfectly match.
Figure 19B:
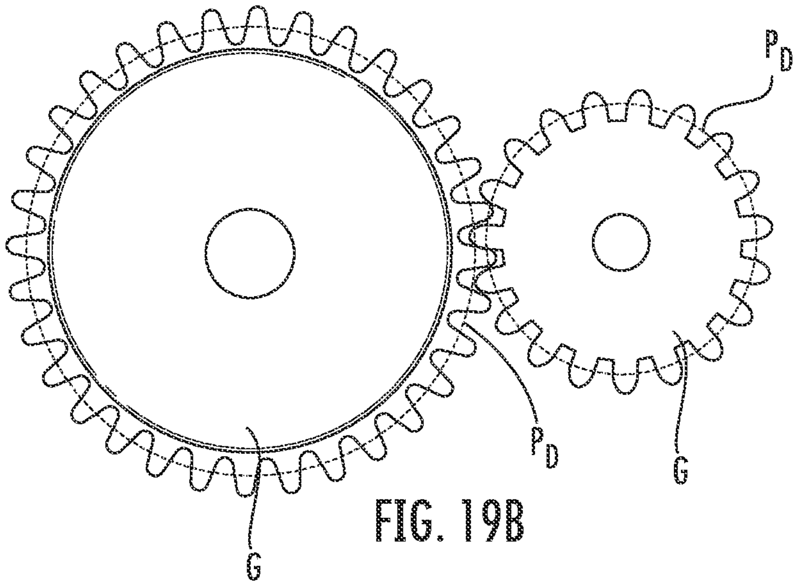
FIG. 19B illustrates conventional gears where the center-to-center offset distance is designed and configured to compensate for variances in materials and/or tolerances to avoid interference between corresponding meshed teeth of adjacent gears.

That is, referring to FIGS. 19A and 19B, and as will be readily appreciated by one of ordinary skill in the art, conventional gears G include a pitch diameter $P_D$. FIG. 19A illustrates a conventional gear G shown in a nominal position with gear teeth/pitch diameters $P_D$ perfectly matching. FIG. 19B illustrates a conventional gear G including a center-to-center offset in the gears G designed and configured to compensate for variances in materials and/or tolerances to avoid interference between corresponding meshed teeth. That is, generally speaking, the pitch diameters $P_D$ of parallel shaft gears G can be determined by measuring the diameter from a center point or distance of the gear G to the circumferentially disposed teeth. Generally speaking, in connection with conventional gears G, the pitch diameters $P_D$ of interconnecting gears G may be designed to exactly mesh (FIG. 19A). More commonly, however, interconnecting gears G may be designed and/or arranged and configured with a slightly reduced pitch diameters $P_D$ and/or offsets to prevent, for example, binding between interconnecting gears G (FIG. 19B). However, one disadvantage with such traditional gears G is that backlash (or slop) between adjacent gears G may be introduced. When used in connection with an architectural-structure covering and, more particularly, when used to couple an external booster to the rotatable member, this unwanted backlash may result in unwanted clearance when the external booster operates to, for example, over-rotate the covering.

Figure 19C:
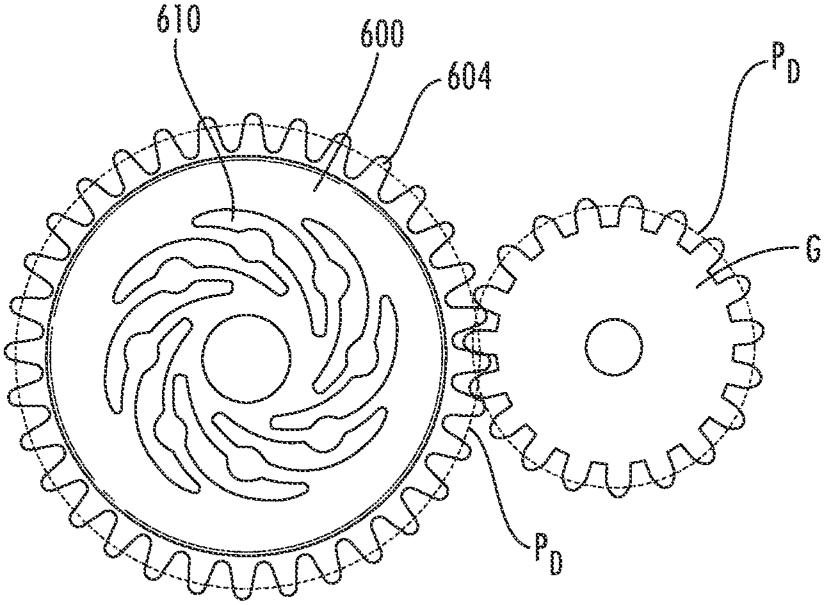
FIG. 19C illustrates a flexible gear as shown in FIG. 18, the flexible gear incorporating interfering gear teeth and/or overlapped pitch diameter in accordance with one or more features of the present disclosure.
Figure 19D:
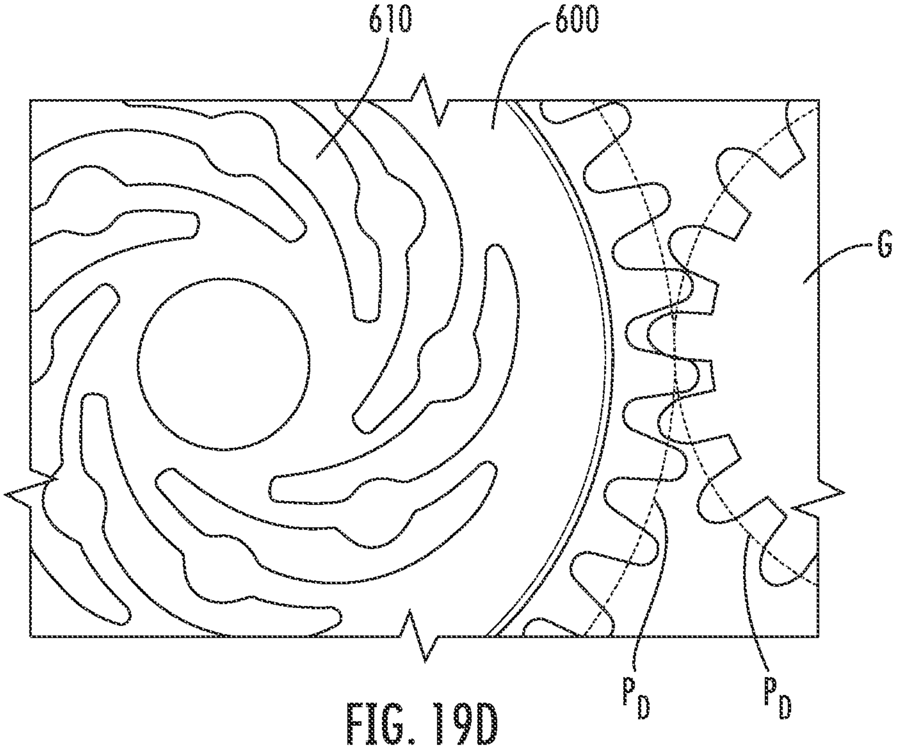
FIG. 19D illustrates a flexible gear as shown in FIG. 18, the flexible gear incorporating an offset center-to-center offset distance arranged and configured to slightly change or adjust as the flexible gear rotates in accordance with one or more features of the present disclosure.

In contrast, referring to FIGS. 19C and 19D, by utilizing a flexible gear 600, the pitch diameter $P_D$ between interconnecting gears 600, G may be designed so that the pitch diameters $P_D$ of the interconnecting gears 600, G overlap (e.g., the diameter of the flexible gear 600 is arranged and configured to be slightly larger than the actual diameter between the interconnecting gears). For example, FIG. 19C illustrates a flexible gear 600 (although one or more flexible gears 600 could be utilized as needed) incorporating interfering gear teeth/pitch diameters $P_D$ in accordance with one or more features of the present disclosure. FIG. 19D illustrates a flexible gear 600 incorporating an offset center arranged and configured to slightly change or adjust as the flexible gear 600 rotate to compensate for gear roundness error. In use, the gear teeth 602 remain fully engaged to eliminate backlash between gear sets.

Thus arranged, in use, when a radially-inwardly directed force $C_F$ is applied to the flexible gear 600 (e.g., by meshing with an adjacent interconnecting gear) the pitch diameter $P_D$ of the flexible gear 600 may compress thereby introducing or creating radially-inwardly directed compression or pressure $C_F$ (FIG. 20C) between intermeshing gears (e.g., intermeshing teeth apply a perpendicular or compression force onto the outer circumference of the flexible gear 600). As such, a frictional or compression force between intercoupling meshed gears may be created, which eliminates, or at least reduces, backlash and thus any unwanted clearance.

In one embodiment, it is envisioned that the flexible gears 600 may be arranged and configured with 3 to 5-thousandths overlap between adjacent pitch diameters $P_D$. This is in contrast to known, traditional gears G, which may be designed with 3 to 5-thousandths clearance to prevent binding between meshing gears.

Referring to FIG. 18, in one embodiment, each spiral may include a bump 612 formed thereon. In use, the bump 612 may serve as limit stops to prevent excess deflection of the gear 600 (e.g., bumps 612 could be arranged and configured to bottom out at a certain deflection/gear load).

It should be appreciated that while the flexible gears 600 are shown with spiral shaped cutouts 610, flexibility could be introduced into the gears 600 by any suitable method now known of hereafter developed. For example, alternate shaped cutouts could be utilized such as, for example, slits, circumferential cutouts, etc. Preferably, the cutouts are arranged and configured to provide a substantially uniform pressure around the gear Alternatively, it is envisioned that that flexible gears could be manufactured with alternate materials having different durometers. Combinations of cutouts (e.g., spirals, slits, circumferential cutouts) and material selection (e.g., durometer) in a single flexible gear 600 are also contemplated.

The foregoing has many advantages. For instance, as described, the external booster 300 may be automatically actuated or triggered during normal extension of a covering 22 to complete or finish a covering extension operation, which may work against gravitational forces, without requiring additional steps by an operator. Further, the external booster 300 may be automatically reset during normal retraction of the covering 22 from an extended position. Moreover, the external booster 300 may be scalable to accommodate different covering sizes. For instance, the size of the spring (e.g., the length and/or wire diameter) may be varied depending upon the weight of the covering 22. In addition, and/or alternatively, different rotational limits can be accommodated (e.g., less total rotation could be provided, if desired). For example, in one embodiment, the non-rotatable shaft 322 and pocket 500 could be designed and configured in different relative positions with respect to the traveling nut 430 so that rotation could limit the travel of the booster assembly. For example, the external booster could be arranged and configured to provide a total rotation of 120 degrees or the like, if required for a product.

The foregoing description has broad application. While the provided examples describe a silhouette-type covering, it should be appreciated that the concepts disclosed herein may equally apply to any type of covering that may selectively use supplemental energy to actuate, extend, and/or open a covering. For instance, the external booster 300 may be used to actuate operable vanes attached to a support sheet. Further, while the provided examples describe the external booster 300 as assisting in an extension of a covering, the external booster 300 may be configured to assist in raising or retracting a covering. Accordingly, the discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, an element or step recited in the singular and proceeded with the word "a" or "an" should be understood as not excluding plural elements or steps, unless such exclusion is explicitly recited.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

What is claimed:

1. An architectural-structure covering, comprising:

a rotatable member;

a covering operatively coupled to the rotatable member, the covering being movable between a retracted position and an extended position; and an external booster operatively coupled to the rotatable member, the external booster comprising:

a biasing mechanism operably associated with the rotatable member to selectively rotate the rotatable member in an extension direction, the biasing mechanism having a preload; and a retention mechanism associated with the biasing mechanism and operable to release the preload at the extended position;

wherein the external booster is spaced apart from the rotatable member, the external booster being coupled to the rotatable member via one or more gears arranged and configured to transfer rotation between the external booster and the rotatable member.

2. The architectural-structure covering of claim 1, wherein the external booster is arranged and configured to transition from a first configuration to a second configuration, in the first configuration, the external booster stores potential energy, in the second configuration, the external booster releases the stored potential energy to rotate the rotatable member.

3. The architectural-structure covering of claim 2, wherein the external booster transitions from the first configuration to the second configuration at a predetermined covering position during extension of the covering.

4. The architectural-structure covering of claim 3, wherein, with the external booster in the first configuration, the biasing mechanism is preloaded, and when the external booster is transitioned to the second configuration, the biasing mechanism releases the preload to rotate the rotatable member.

5. The architectural-structure covering of claim 4, wherein movement of the covering from the extended position to the retracted position, automatically transitions the external booster from the second configuration to the first configuration, and thus preloads the biasing mechanism.

6. The architectural-structure covering of claim 2, wherein the external booster includes a non-rotatable shaft.

7. The architectural-structure covering of claim 6, wherein the non-rotatable shaft is arranged and configured to couple to an end plate of a head rail assembly of the architectural-structure covering.

8. The architectural-structure covering of claim 6, further comprising a coupling mechanism movable between a first position and a second position, the retention mechanism being coupled to the non-rotatable shaft when the coupling mechanism is in the first position, the retention mechanism being disconnected from the non-rotatable shaft when the coupling mechanism is in the second position.

9. The architectural-structure covering of claim 6, wherein the biasing mechanism includes a spring guide, a spring cap, and a spring, the spring cap being rotationally fixed to the non-rotatable shaft, the spring guide including a bore arranged and configured to enable the non-rotatable shaft to pass therethrough, the spring being positioned between the spring cap and the spring guide arranged and configured to bias the spring guide away from the spring cap.

10. The architectural-structure covering of claim 9, wherein, in the first configuration, the spring biases the spring guide away from the spring cap, and the spring guide is inhibited from moving, in the second configuration, the spring guide is movable so that the spring applies a force to the spring guide causing the retention mechanism and hence the rotatable member to rotate.

11. The architectural-structure covering of claim 10, wherein the retention mechanism includes an externally threaded bolt, a traveling nut, and a drive sleeve, the traveling nut being threadably coupled to the externally threaded bolt such that rotation of the traveling nut relative to the externally threaded bolt causes the traveling nut to axially translate along a longitudinal length of the externally threaded bolt, the externally threaded bolt including a bore arranged and configured to pass the non-rotatable shaft to therethrough.

12. The architectural-structure covering of claim 11, wherein in the first configuration, the externally threaded bolt is inhibited from rotating, and in the second configuration, the externally threaded bolt is permitted to rotate.

13. The architectural-structure covering of claim 12, wherein the externally threaded bolt is operatively coupled to the spring cap so that, in the second configuration, the spring biases the spring cap causing the spring cap and the externally threaded bolt to rotate in unison.

14. The architectural-structure covering of claim 13, wherein rotation of the spring cap and the externally threaded bolt causes the traveling nut and the drive sleeve to rotate, the drive sleeve being coupled to one of the one or more gears, so that rotation of the drive sleeve rotates the rotatable member.

15. The architectural-structure covering of claim 14, wherein rotation of the traveling nut causes the traveling nut to axially translate toward a first end portion of the externally threaded bolt causing the traveling nut to contact a coupling mechanism causes the coupling mechanism to move from a first position to a second position.

16. The architectural-structure covering of claim 15, wherein the coupling mechanism is a pawl, in the first position, a portion of the pawl is received within a pocket formed in the non-rotatable shaft, in the second position, the portion of the pawl is removed from the pocket formed in the non-rotatable shaft.

17. The architectural-structure covering of claim 16, wherein axial translation of the traveling nut towards the first end portion of the externally threaded bolt causes the traveling nut to contact the pawl moving the pawl from the first position to the second position.

18. The architectural-structure covering of claim 17, wherein the pawl includes a pin extending from a rear surface of the pawl, the traveling nut includes a pathway formed in a contacting surface thereof, interaction between the pin and the pathway causing the pawl to move from the first position to the second position.

19. The architectural-structure covering of claim 1, wherein the covering is a first covering and the rotatable member includes an outer roller operatively associated with the first covering and an inner roller positioned within the outer roller, the inner roller operatively associated with a second covering.

20. The architectural-structure covering of claim 19, wherein:

- the first covering is movable between the retracted position and the extended position, and between an open configuration and a closed configuration, the first covering including a front sheet, a rear sheet, and a plurality of vanes extending between the front and rear sheets,
- in the closed configuration, the front and rear sheets are positioned directly adjacent to each other and the plurality of vanes extend vertically in an approximately coplanar, contiguous relationship with the front and rear sheets,
- in the open configuration, the front and rear sheets are horizontally spaced apart from each other with the plurality of vanes extending horizontally therebetween; and
- the external booster is arranged and configured to provide supplemental rotation to ensure that the first covering is rotated to the open configuration.

21. The architectural-structure covering of claim 1, wherein the one or more gears is arranged and configured to flex or compress.

22. The architectural-structure covering of claim 21, wherein the one or more gears includes a plurality of cutouts formed in a body thereof.

23. The architectural-structure covering of claim 22, wherein the plurality of cutouts are spiral-shaped.

24. The architectural-structure covering of claim 21, wherein the one or more gears are manufactured from a flexible material.

25. An external booster for use with an architectural-structure covering having a rotatable member and a covering coupled to the rotatable member and movable between a first position and a second position via rotation of the rotatable member, wherein:

- the external booster is movable between a first state of operation and a second state of operation, in the first state of operation the external booster is arranged and configured to store potential energy, and in the second state of operation, the external booster releases the stored potential energy to rotate the rotatable member in a predetermined direction to effect additional rotation of the covering;
- the external booster is spaced apart from the rotatable member, the external booster being coupled to the rotatable member via one or more gears arranged and configured to transfer rotation between the external booster and the rotatable member; and
- the external booster is arranged and configured to transition from the first state of operation to the second state of operation at a predetermined covering position during extension or deployment of the covering.

* * * * *